US 10,550,858 B2

(12) United States Patent
Fukao et al.

(10) Patent No.: US 10,550,858 B2
(45) Date of Patent: Feb. 4, 2020

(54) BICYCLE CONTROL DEVICE

(71) Applicant: Shimano Inc., Sakai, Osaka (JP)

(72) Inventors: Kazutaka Fukao, Osaka (JP); Yoshimitsu Miki, Osaka (JP); Kentaro Kosaka, Osaka (JP); Takaaki Fujiwara, Osaka (JP)

(73) Assignee: Shimano Inc., Osaka (JP)

( * ) Notice: Subject to any disclaimer, the term of this patent is extended or adjusted under 35 U.S.C. 154(b) by 398 days.

(21) Appl. No.: 14/468,196

(22) Filed: Aug. 25, 2014

(65) Prior Publication Data

US 2016/0052587 A1  Feb. 25, 2016

(51) Int. Cl.
*B62K 23/06* (2006.01)
*B62K 21/26* (2006.01)
*F15B 7/08* (2006.01)
*B62L 3/02* (2006.01)

(52) U.S. Cl.
CPC ............... *F15B 7/08* (2013.01); *B62K 21/26* (2013.01); *B62K 23/06* (2013.01); *B62L 3/023* (2013.01)

(58) Field of Classification Search
CPC ........ B62M 25/04; B62K 23/06; B62K 21/26; B62K 21/16; G05G 11/00; F15B 7/08
See application file for complete search history.

(56) References Cited

U.S. PATENT DOCUMENTS

| | | | |
|---|---|---|---|
| 2,271,273 A | 5/1940 | Mueller | |
| 4,665,803 A | 5/1987 | Mathauser | |
| 4,921,081 A | 5/1990 | Chilcote | |
| 5,241,878 A | 9/1993 | Nagano | |
| 5,400,675 A | 3/1995 | Nagano | |
| 6,073,730 A | 6/2000 | Abe | |
| 7,055,323 B2 * | 6/2006 | Idei ........................ | B60T 11/16 60/550 |
| 7,062,989 B2 | 6/2006 | Tsumiyama | |
| 7,124,873 B2 | 10/2006 | Tsumiyama | |
| 8,201,670 B2 | 6/2012 | Tetsuka et al. | |
| 8,464,844 B2 | 6/2013 | Jordan | |
| 9,120,522 B1 * | 9/2015 | Nishino .................. | B62L 3/023 |
| 9,321,501 B1 * | 4/2016 | Miki ...................... | B62K 23/06 |

(Continued)

FOREIGN PATENT DOCUMENTS

| | | |
|---|---|---|
| CN | 1676417 A | 10/2005 |
| CN | 201102467 Y | 8/2008 |

(Continued)

OTHER PUBLICATIONS

Define portion, google.com., Dec. 17, 2016.*
English Abstract of FR 2686659 A1, Tobiasz, Jul. 1993.*

*Primary Examiner* — Vinh Luong
(74) *Attorney, Agent, or Firm* — Global IP Counselors, LLP

(57) ABSTRACT

A bicycle control device is basically provided with a bracket, a shift unit, a hydraulic cylinder unit and a first operating member. The bracket includes a coupling portion that is configured to be coupled to a handlebar. The shift unit is mounted to the bracket. The hydraulic cylinder unit is mounted to the bracket in a location that is closer to the coupling portion than the shift unit. The first operating member is pivotally mounted relative to the bracket around a first pivot axis to operate the hydraulic cylinder unit. The first pivot axis is disposed between the shift unit and the coupling portion.

37 Claims, 24 Drawing Sheets

(56) References Cited

U.S. PATENT DOCUMENTS

| | | | |
|---|---|---|---|
| 9,896,150 B2* | 2/2018 | Fujiwara | B62L 3/023 |
| 2007/0068314 A1 | 3/2007 | Miki | |
| 2007/0175290 A1* | 8/2007 | Fujii | B62K 23/02 |
| | | | 74/502.2 |
| 2008/0121066 A1* | 5/2008 | Takebayashi | B62K 23/06 |
| | | | 74/502.2 |
| 2008/0196537 A1 | 8/2008 | Dal Pra' | |
| 2009/0152063 A1* | 6/2009 | Tsai | B60T 11/16 |
| | | | 188/344 |
| 2009/0315692 A1 | 12/2009 | Miki et al. | |
| 2010/0083788 A1 | 4/2010 | Jordan et al. | |
| 2010/0199798 A1 | 8/2010 | Uno | |
| 2011/0011197 A1* | 1/2011 | Oku | B60T 7/085 |
| | | | 74/473.12 |
| 2011/0031078 A1* | 2/2011 | Matsushita | B60T 7/102 |
| | | | 188/344 |
| 2011/0147149 A1* | 6/2011 | Tetsuka | B62L 3/023 |
| | | | 188/344 |
| 2012/0240715 A1 | 9/2012 | Tsai | |
| 2012/0297919 A1* | 11/2012 | Fukao | B62K 23/06 |
| | | | 74/502.2 |
| 2013/0047774 A1* | 2/2013 | Clement | B60T 7/102 |
| | | | 74/502.2 |
| 2013/0081506 A1* | 4/2013 | Fukao | B62M 25/04 |
| | | | 74/502.2 |
| 2013/0180815 A1 | 7/2013 | Dunlap et al. | |
| 2013/0255239 A1 | 10/2013 | Miki | |
| 2015/0001018 A1* | 1/2015 | Kariyama | B62L 3/023 |
| | | | 188/344 |
| 2015/0090550 A1* | 4/2015 | Matsueda | B62L 3/023 |
| | | | 188/344 |
| 2016/0221632 A1* | 8/2016 | Fujiwara | B62L 3/023 |
| 2016/0327067 A1* | 11/2016 | Fujiwara | B62K 21/26 |
| 2016/0327070 A1* | 11/2016 | Fujiwara | B62K 23/00 |
| 2016/0347415 A1* | 12/2016 | Katsura | B62M 25/04 |
| 2017/0008599 A1* | 1/2017 | Kosaka | B62M 25/04 |
| 2018/0118301 A1* | 5/2018 | Komada | B62K 23/06 |
| 2018/0118303 A1* | 5/2018 | Komada | B62L 3/023 |
| 2018/0141612 A1* | 5/2018 | Hara | B62K 23/06 |
| 2018/0208266 A1* | 7/2018 | Komada | B62K 23/06 |
| 2018/0238354 A1* | 8/2018 | Komada | F15B 7/08 |

FOREIGN PATENT DOCUMENTS

| | | | |
|---|---|---|---|
| DE | 42 16 154 A1 | 10/1993 | |
| DE | 60 2005 004 350 T2 | 1/2009 | |
| DE | 10 2013 223 715 A1 | 6/2014 | |
| FR | 57 807 E | 9/1953 | |
| FR | 2686659 A1 * | 7/1993 | |
| TW | I342850 B | 6/2011 | |
| TW | I355352 B | 1/2012 | |

* cited by examiner

BICYCLE CONTROL DEVICE

BACKGROUND

Field of the Invention

This invention generally relates to a bicycle control device. More specifically, the present invention relates to a bicycle control device having a shift unit and a hydraulic cylinder unit.

Background Information

In the past, most bicycles used cables to operate the various bicycle components to perform such functions as shifting gears and braking. Examples of some bicycle control devices that combine both shifting and braking functions into a single unit are disclosed in the following patents: U.S. Pat. Nos. 4,241,878; 5,257,683; and 5,400,675. In recent years, some bicycles have been provided with hydraulic bicycle components. For example, some bicycles include transmissions for changing gear stages or speed stages and hydraulic braking device for stopping or slowing down the bicycle. It is desired to more effectively control both the transmission and the hydraulic braking device by a single bicycle control device.

SUMMARY

Generally, the present disclosure is directed to various features of a bicycle control device. In one feature, a bicycle control device is provided with a shift unit and a hydraulic cylinder unit.

In view of the state of the known technology and in accordance with a first aspect of the present disclosure, a bicycle control device is basically provided that comprises a bracket, a shift unit, a hydraulic cylinder unit; and a first operating member. The bracket includes a coupling portion that is configured to be coupled to a handlebar. The shift unit is mounted to the bracket. The hydraulic cylinder unit is mounted to the bracket in a location that is closer to the coupling portion than the shift unit. The first operating member is pivotally mounted relative to the bracket around a first pivot axis to operate the hydraulic cylinder unit. The first pivot axis is disposed between the shift unit and the coupling portion.

In accordance with a second aspect of the present invention, the bicycle control device according to the first aspect is configured so that the hydraulic cylinder unit is disposed between the shift unit and the coupling portion.

In accordance with a third aspect of the present invention, the bicycle control device according to the first aspect is configured so that the shift unit is mounted to a distal end of the bracket which is opposite to the coupling portion.

In accordance with a fourth aspect of the present invention, the bicycle control device according to the first aspect is configured so that the first operating member is arranged between the hydraulic cylinder unit and the shift unit.

In accordance with a fifth aspect of the present invention, the bicycle control device according to the first aspect is configured so that the first operating member is configured to be pivoted around a second pivot axis that is different from the first pivot axis to actuate the shift unit.

In accordance with a sixth aspect of the present invention, the bicycle control device according to the fifth aspect is configured so that the hydraulic cylinder unit includes a hydraulic cylinder defining a longitudinal center axis and a piston movably disposed in the hydraulic cylinder along the longitudinal center axis. The first operating member is connected to the piston to move the piston as the first operating member is pivoted around the first pivot axis. The longitudinal center axis is coaxial with the second pivot axis.

In accordance with a seventh aspect of the present invention, the bicycle control device according to the sixth aspect further comprises an attachment member that is pivotally coupled to the hydraulic cylinder unit around the second pivot axis. The first operating member is pivotally mounted to the attachment member around the first pivot axis.

In accordance with an eighth aspect of the present invention, the bicycle control device according to the sixth aspect further comprises a second operating member pivotally mounted relative to the bracket around a third pivot axis to operate the shift unit.

In accordance with a ninth aspect of the present invention, the bicycle control device according to the eighth aspect is configured so that the third pivot axis is coaxial with the second pivot axis.

In accordance with a tenth aspect of the present invention, the bicycle control device according to the sixth aspect is configured so that the shift unit includes a cable take-up member configured to be rotatable around a take-up axis.

In accordance with an eleventh aspect of the present invention, the bicycle control device according to the tenth aspect is configured so that the take-up axis is coaxial with the second pivot axis.

In accordance with a twelfth aspect of the present invention, the bicycle control device according to the first aspect is configured so that the hydraulic cylinder unit has a fluid outlet that is located adjacent to the coupling portion.

In accordance with a thirteenth aspect of the present invention, the bicycle control device according to the first aspect is configured so that the hydraulic cylinder unit is configured to be detachably mounted to the bracket.

In accordance with a fourteenth aspect of the present invention, the bicycle control device according to the first aspect is configured so that the hydraulic cylinder unit includes a hydraulic cylinder defining a longitudinal center axis. The first operating member has a mounting portion having the first pivot axis and a distal free end portion which is spaced from the bracket. The first pivot axis is located on a first side of the center longitudinal axis, and the distal free end portion being located on a second side of the center longitudinal axis as viewed in a direction parallel to the first pivot axis.

In accordance with a fifteenth aspect of the present invention, the bicycle control device according to the first aspect is configured so that the shift unit remains stationary as the first operating member pivots with respect to the bracket around the first pivot axis.

In accordance with a sixteenth aspect of the present invention, the bicycle control device according to the first aspect further comprises a second operating member pivotally mounted relative to the bracket around a third pivot axis to operate the shift unit.

In accordance with a seventeenth aspect of the present invention, the bicycle control device according to the sixteenth aspect is configured so that the second operating member is configured to pivot along a shifting path from a rest position to a first shift position to actuate the shift unit, and is configured to be moved further along the shifting path from the rest position past the first shift position to a second shift position to actuate the shift unit. The shift unit includes a cable take-up member configured to be rotatable around a take-up axis. The shift unit is configured to rotate the cable take-up member in a first direction about the take-up axis as the second operating member is moved from the rest position to the first shift position. The shift unit is configured to rotate the cable take-up member in a second direction about the take-up axis as the second operating member is moved from the rest position to the second shift position. The second direction is opposite to the first direction.

In accordance with an eighteenth aspect of the present invention, the bicycle control device according to the first aspect further comprises a reservoir unit fluidly communicating with the hydraulic cylinder unit.

In accordance with a nineteenth aspect of the present invention, the bicycle control device according to the eighteenth aspect is configured so that the reservoir unit is configured to be detachably mounted to the bracket.

In accordance with a twentieth aspect of the present invention, the bicycle control device according to the first aspect is configured so that the hydraulic cylinder unit is mounted to the bracket at a location that is closer to the handlebar than the shift unit in a state where the bicycle control device is mounted to the handlebar.

In accordance with a twenty-first aspect of the present invention, the bicycle control device according to the first aspect is configured so that the bracket includes abuse portion and an attachment portion. The base portion has the coupling portion. The attachment portion is configured to be removably attached to the base portion and to cover the shift unit.

In accordance with a twenty-second aspect of the present invention, the bicycle control device according to the twenty-first aspect is configured so that the shift unit is mounted to the attachment portion, and the attachment portion is removably mounted to the base portion with the shift unit being mounted to the attachment portion as unit.

In accordance with a twenty-third aspect of the present invention, the bicycle control device according to the twenty-first aspect is configured an that the attachment portion is located at a distal end of the bracket with respect to the handlebar in the state where the base portion is mounted to the handlebar.

In accordance with a twenty-fourth aspect of the present invention, the bicycle control device according to the first aspect is configured so that the coupling portion is configured to be coupled to an end portion of the handlebar.

In accordance with a twenty-fifth aspect of the present invention, the bicycle control device according to the first aspect is configured so that the coupling portion includes a mounting surface configured to be mounted on an outer peripheral surface of a handlebar.

In accordance with a twenty-sixth aspect of the present invention, the bicycle control device according to the twenty-fifth aspect is configured so that the bracket includes a handlebar fixing structure disposed on the mounting surface. The hydraulic cylinder unit includes a hydraulic cylinder defining a longitudinal center axis that is disposed under the handlebar fixing structure in a state where the bracket is attached to the handlebar by the handlebar fixing structure.

In accordance with a twenty-seventh aspect of the present invention, the bicycle control device according to the first aspect is configured so that the bracket includes a gripping portion extending from the mounting surface and configured to be gripped by a rider.

In accordance with a twenty-eighth aspect of the present invention, a bicycle control device is provided that basically comprises a bracket, a shift unit, a hydraulic cylinder unit and a first operating member. The bracket is configured to be coupled to a handlebar. The shift unit is mounted to the bracket. The hydraulic cylinder unit is mounted to the bracket in a location that is closer to the handlebar than the shift unit in a state where the bicycle control device is mounted to the handlebar. The first operating member is pivotally mounted relative to the bracket around a first pivot axis to operate the hydraulic cylinder unit. The first pivot axis is disposed between the shift unit and the hydraulic cylinder unit.

In accordance with a twenty-ninth aspect of the present invention, the bicycle control device according to the twenty-seventh aspect is configured so that the hydraulic cylinder unit is detachably mounted to the bracket so as to be detached and reattached to the bracket.

In accordance with a twenty-ninth aspect of the present invention, the bicycle control device according to the twenty-eighth aspect is configured so that the hydraulic cylinder unit is configured to be detachably mounted to the bracket.

In accordance with a thirtieth aspect of the present invention, the bicycle control device according to the twenty-eighth aspect further comprises a reservoir unit fluidly communicating with the hydraulic cylinder unit.

In accordance with a thirty-first aspect of the present invention, the bicycle control device according to the thirtieth aspect is configured so that the reservoir unit is configured to be detachably mounted to the bracket.

In accordance with a thirty-second aspect of the present invention, the bicycle control device according to the twenty-eighth aspect is configured so that the bracket includes a base portion and an attachment portion. The base portion has the coupling portion. The attachment portion is configured to be removably attached to the base portion and to cover the shift unit.

In accordance with a thirty-third aspect of the present invention, the bicycle control device according to the thirty-second aspect is configured so that the shift unit is mounted to the attachment portion, and the attachment portion is removably mounted to the base portion with the shift unit being mounted to the attachment portion as unit.

In accordance with a thirty-fourth aspect of the present invention, the bicycle control device according to the thirty-second aspect is configured so that the attachment portion is located at a distal end of the bracket with respect to the handlebar in the state where the base portion is mounted to the handlebar.

In accordance with a thirty-fifth aspect of the present invention, the bicycle control device according to the twenty-eighth aspect is configured so that the hydraulic cylinder unit includes a hydraulic cylinder defining a longitudinal center axis. The first operating member has a mounting portion having the first pivot axis and a distal free end portion which is spaced from the bracket. The first pivot axis is located on a first side of the center longitudinal axis. The distal free end portion is located on a second side of the center longitudinal axis as viewed in a direction parallel to the first pivot axis.

In accordance with a thirty-sixth aspect of the present invention, a bicycle control device is provided that basically comprises a bracket, a shift unit and a hydraulic cylinder unit. The shift unit is mounted to the bracket. The hydraulic cylinder unit is mounted to the bracket in a location that is closer to the handlebar than the shift unit in a state where the bicycle control device is mounted to the handlebar. The bracket includes a base portion configured to be coupled to a handlebar, and an attachment portion configured to be removably attached to the base portion and to cover the shift unit.

In accordance with a thirty-seventh aspect of the present invention, the bicycle control device according to the thirty-sixth aspect is configured so that the shift unit is mounted to the attachment portion, and the attachment portion is removably mounted to the base portion with the shift unit being mounted to the attachment portion as unit.

In accordance with a thirty-eighth aspect of the present invention, the bicycle control device according to the thirty-sixth aspect is configured so that the attachment portion is located at a distal end of the bracket with respect to the handlebar in the state where the base portion is mounted to the handlebar.

In accordance with a thirty-ninth aspect of the present invention, a bicycle control device is provided that basically comprises a bracket, a shift unit and a hydraulic cylinder unit. The bracket includes a mounting surface configured to be mounted on a handlebar. The shift unit is mounted to the bracket. The hydraulic cylinder unit is mounted to the bracket so as to be disposed between the mounting surface and the shift unit without overlapping with the shift unit.

In accordance with a fortieth aspect of the present invention, the bicycle control device according to the first aspect is configured so that the first pivot axis of the first operating member is disposed above a center longitudinal axis of the hydraulic cylinder unit in a state where the bracket is attached to the handlebar.

Also other objects, features, aspects and advantages of the disclosed bicycle control device will become apparent to those skilled in the art from the following detailed description, which, taken in conjunction with the annexed drawings, discloses one embodiment of the bicycle control device.

BRIEF DESCRIPTION OF THE DRAWINGS

Referring now to the attached drawings which for a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
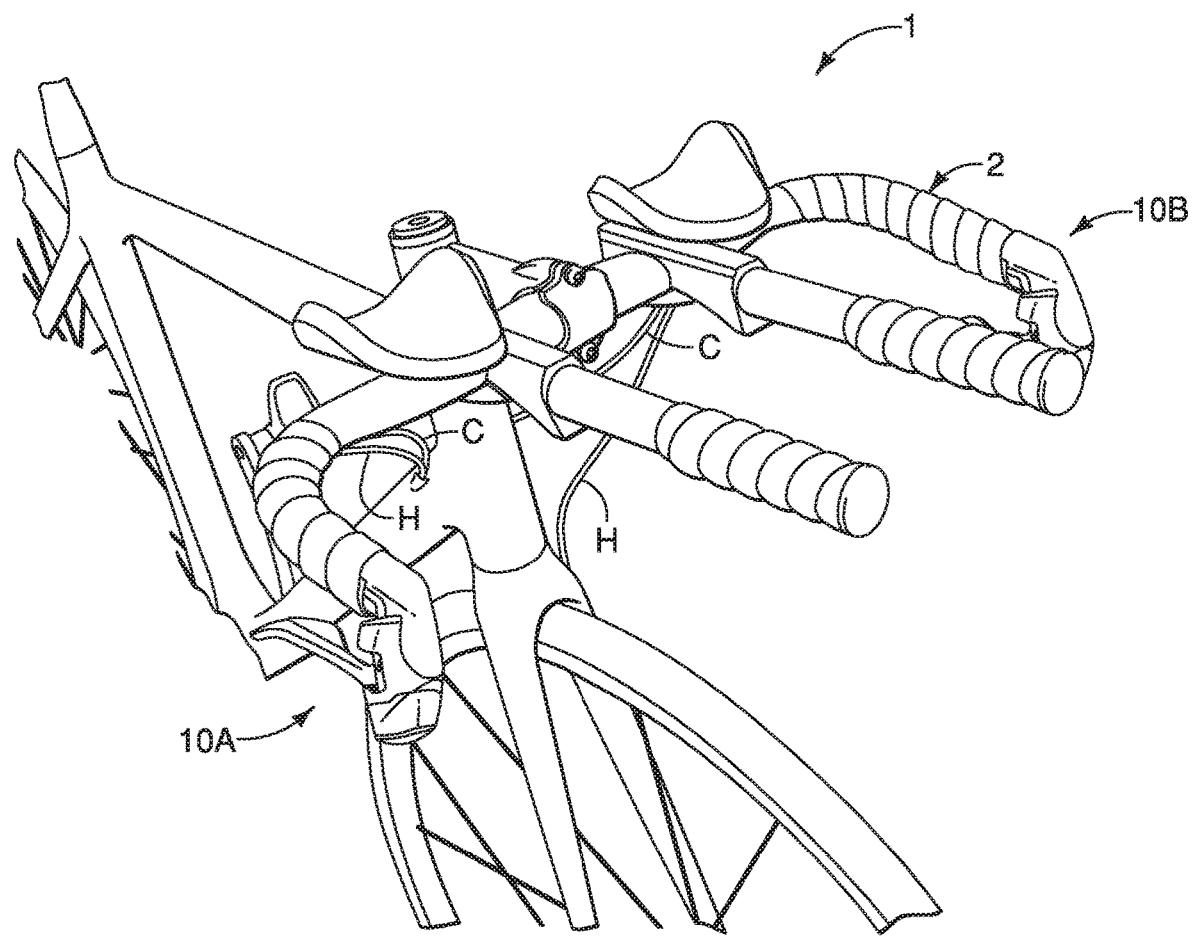
FIG. 1 is a partial front perspective view of a time trial bicycle having a bull horn handlebar that is equipped with a pair of bicycle control devices in accordance with a first embodiment.

Referring initially to FIG. 1, a portion of a time trial bicycle 1 is illustrated having a handlebar 2 with a pair of bicycle control devices 10A and 10B in accordance with a first embodiment. The bicycle control devices 10A and 10B are configured to be mounted to opposite ends of the handlebar 2, respectively. Here in the first embodiment, the handlebar 2 is a time trial or bull horn handlebar in which the bicycle control devices 10A and 10B are inserted into openings defined by the opposite free ends of the handlebar 2. Thus, each of the bicycle control devices 10A and 10B is a bar-end control device, which means that they are configured to be mounted to a free end of a handlebar and protrude outwardly in an axial direction from the free end of a handlebar.

Basically, as seen in FIG. 1, the bicycle control device 10A is a right hand side control device that is operated by the rider's right hand to actuate a first hydraulic brake device (not shown) and a first transmission (not shown). The bicycle control device 10B is a left hand side control device that is operated by the rider's left hand to actuate a second hydraulic brake device (not shown) and a second transmission (not shown). The first and second transmission or gear shifting devices are part of a conventional bicycle driving system that is used to shift a bicycle chain for changing speed stages or gear stages of the drive train in a relatively conventional manner. The bicycle control device 10A is operatively coupled to the first hydraulic brake device (not shown) via a hydraulic brake hose and to the first transmission (not shown) via a control cable C. The bicycle control device 10B is operatively coupled to the second hydraulic brake device (not shown) via a hydraulic brake hose H, and to the second transmission (not shown) via a control cable C.

Since the bicycle control devices 10A and 10B are each configured to operate both a transmission and a hydraulic brake device, the bicycle control devices 10A and 10B are also known as bicycle brifters. In other words, a bicycle brifter is a device that includes both a braking function and a shifting function in a single unit that is mounted to the bicycle. In the illustrated embodiment, the right and left bicycle control devices 10A and 10B are essentially identical in operation, except that they are mirror images of each other and they may have a different number of shift operations. Thus, only the bicycle control device 10A will be discussed and illustrated herein.

Referring to FIGS. 2 to 7, the bicycle control device 10A preferably includes a bracket 12, a shift unit 14, a hydraulic cylinder unit 16 and a first operating member 18. Preferably, in the first embodiment, the bicycle control device 10A further includes a second operating member 20. The first and second operating members 18 and 20 are used to operate the shift unit 14 as explained below. The first operating member 18 is also used to operate the hydraulic cylinder unit 16 as explained below. Also as explained below, the first and second operating members 18 and 20 are trigger levers that are biased to their rest positions such that they automatically return to the their rest position upon being released from an operated position.

FIGS. 2 to 8 illustrates the bicycle control device 10A with its various parts in their rest positions. The term "rest position" as used herein refers to a state in which a movable part (e.g., the first and second operating members 18 and 20) remains stationary without the need of a user intervening (e.g., holding the movable part) to establish a state corresponding to the rest position. Thus, the term "rest position" can also be referred to as a non-operated position. The term "end position" as used herein refers a state in which a movable part (e.g., the first and second operating members 18 and 20) is prevent from be moved further away from the rest position in a movement direction of a movement stroke of that movable part. The term "operated position" as used herein refers a state in which a movable part (e.g., first and second operating members 18 and 20) is moved from the rest position to a position as a result of an external force being applied to the movable part.

Figure 2:
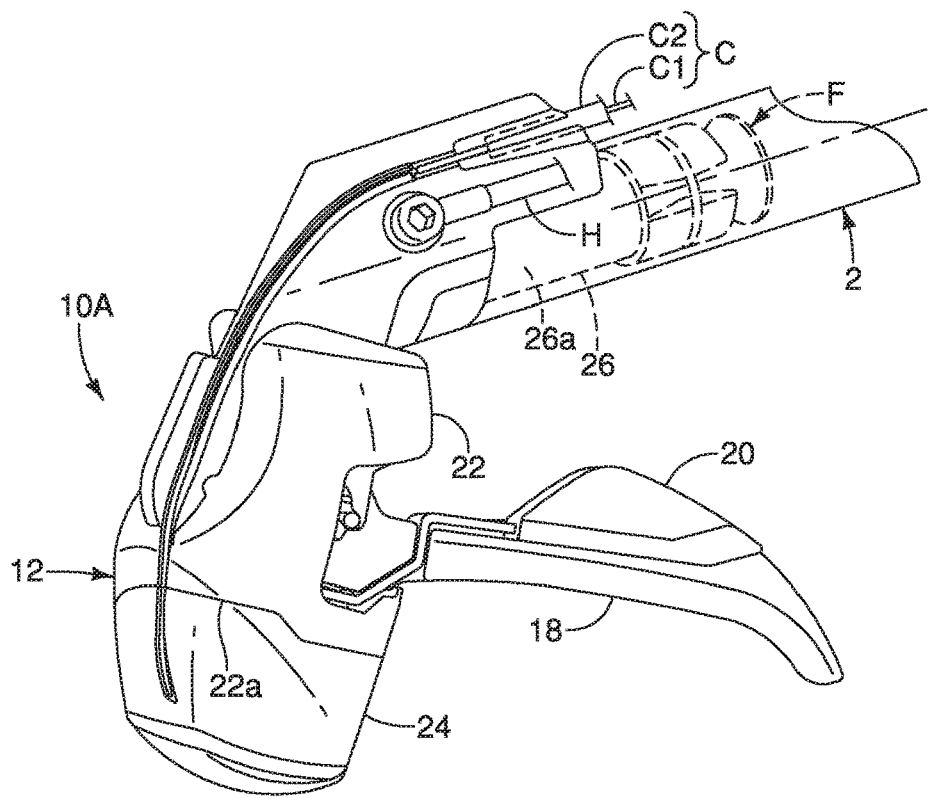
FIG. 2 is an inside perspective view of the right bicycle control device that is attached to the right free end of the handlebar illustrated in FIG. 1.
Figure 3:
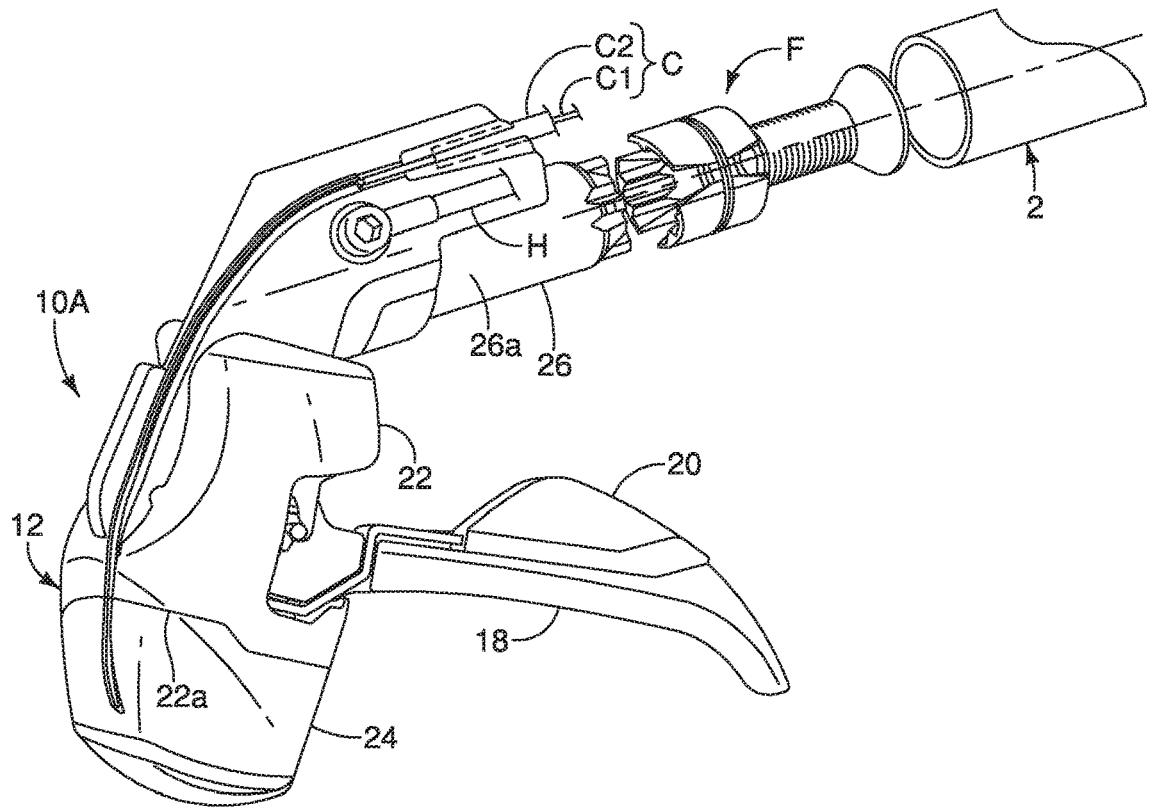
FIG. 3 is an inside perspective view, similar to FIG. 2, of the right bicycle control device, but prior to attachment to right free end of the handlebar illustrated in FIGS. 1 and 2.
Figure 4:
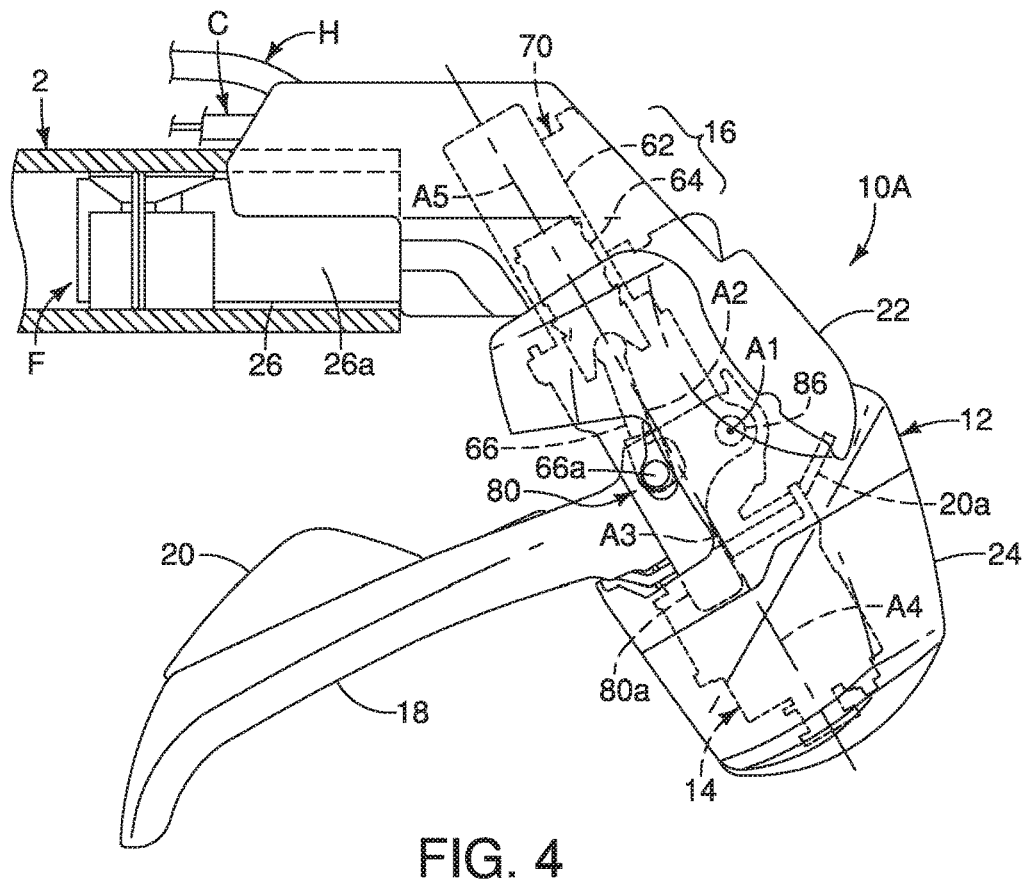
FIG. 4 is an outside elevational view of the right bicycle control device illustrated in FIGS. 1 to 3 with the first and second operating members in their rest (non-operated) positions.

As seen in FIGS. 2 and 3, the bracket 12 is configured to be coupled to an end portion of the handlebar 2. The bracket 12 houses both the shift unit 14 and the hydraulic cylinder unit 16. The bracket 12 basically includes a base portion 22 and a shift unit attachment portion (hereinafter, "attachment portion") 24. The base portion 22 and the attachment portion 24 are hard, rigid members that are made of a suitable material such as a hard rigid plastic material. The shift unit 14 is mounted to the attachment portion 24 of the bracket 12. The hydraulic cylinder unit 16 is mounted to the base portion 22 of the bracket 12. With this configuration, the hydraulic cylinder unit 16 is mounted to the bracket 12 in a location that is closer to the handlebar 2 than the shift unit 14 in a state where the bicycle control device 10A is mounted to the handlebar 2.

The base portion 22 of the bracket 12 includes a coupling portion 26 that is configured to be coupled to the handlebar 2. The coupling portion 26 defines a proximal end of the base portion 22 of the bracket 12 with respect to an end portion of the handlebar 2. In this embodiment, the coupling portion 26 is configured to be coupled to an end portion of the handlebar 2. In more detail, the coupling portion 26 has a cylindrical shape such that the coupling portion 26 is inserted to an opening provided on the end portion of the handlebar 2. The coupling portion 26 of the bracket 12 is fixedly mounted to the handlebar 2 by a fixing structure F that is provided on the coupling portion 26. In the first embodiment, the portions of the bracket 12 rearward of the first and second operating members 18 and 20, except for the coupling portion 26, can be considered as a gripping portion of the bicycle control device 10A.

Since such the fixing structure F is conventional and well known within the bicycle field, it will not be discussed in detail herein for the sake of brevity. The coupling portion 26 of the bracket 12 further includes a mounting surface 26a that is configured to be coupled to the handlebar 2. In this way, the base portion 22 has the mounting surface 26a.

Figure 7:
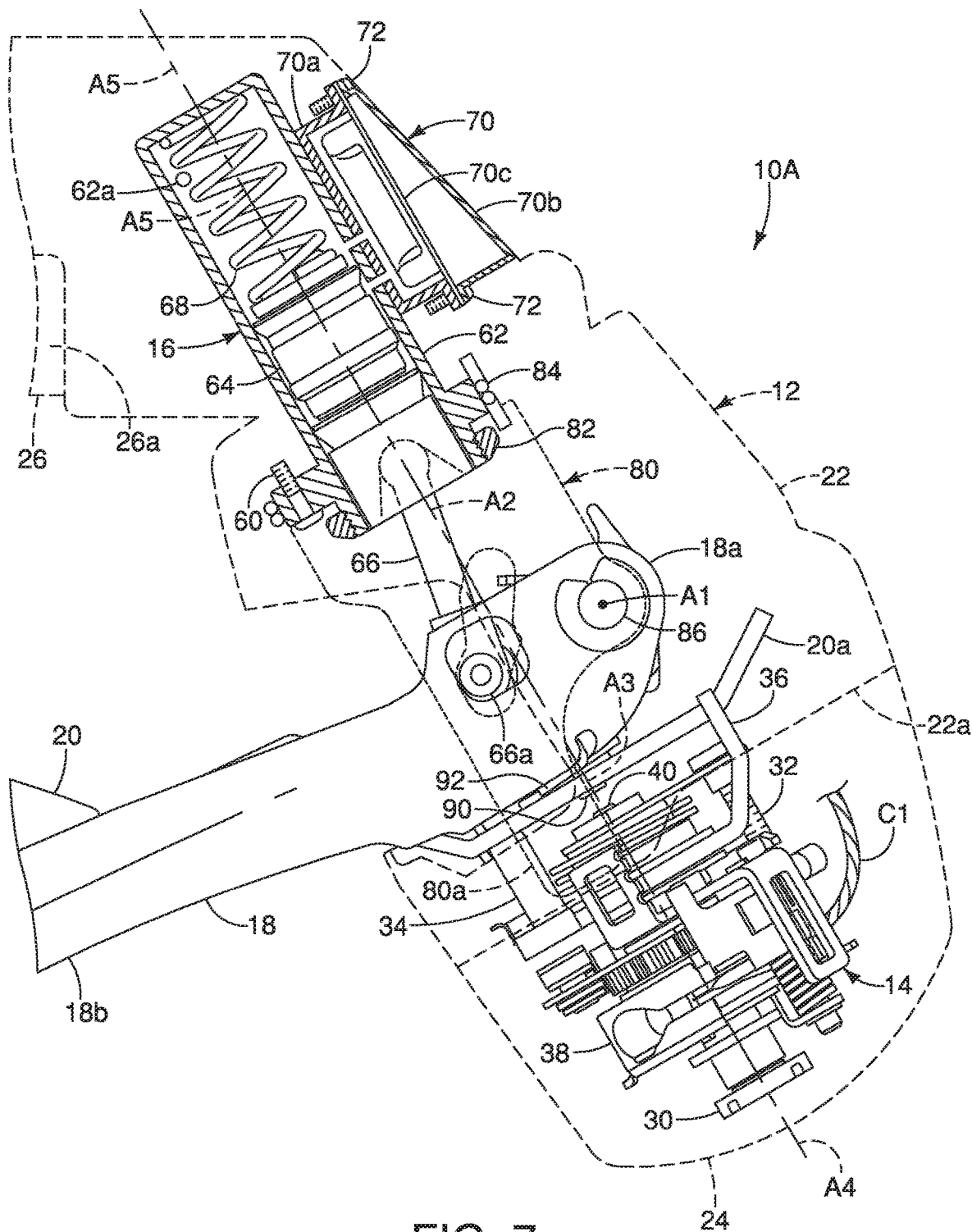
FIG. 7 is an outside elevational view of selected internal parts of the right bicycle control device illustrated in FIGS. 1 to 6 with the first and second operating members in their rest positions.
Figure 8:
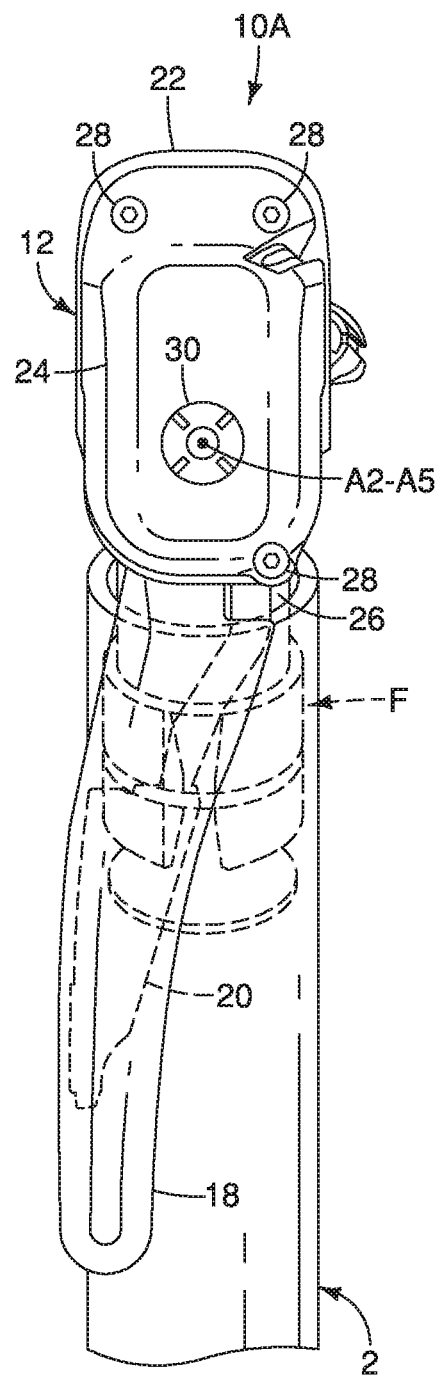
FIG. 8 is a front oblique view of the right bicycle control device illustrated in FIGS. 1 to 7 as viewed parallel to the take-up axis of the shift unit with the first and second operating members in their rest positions.
Figure 11:
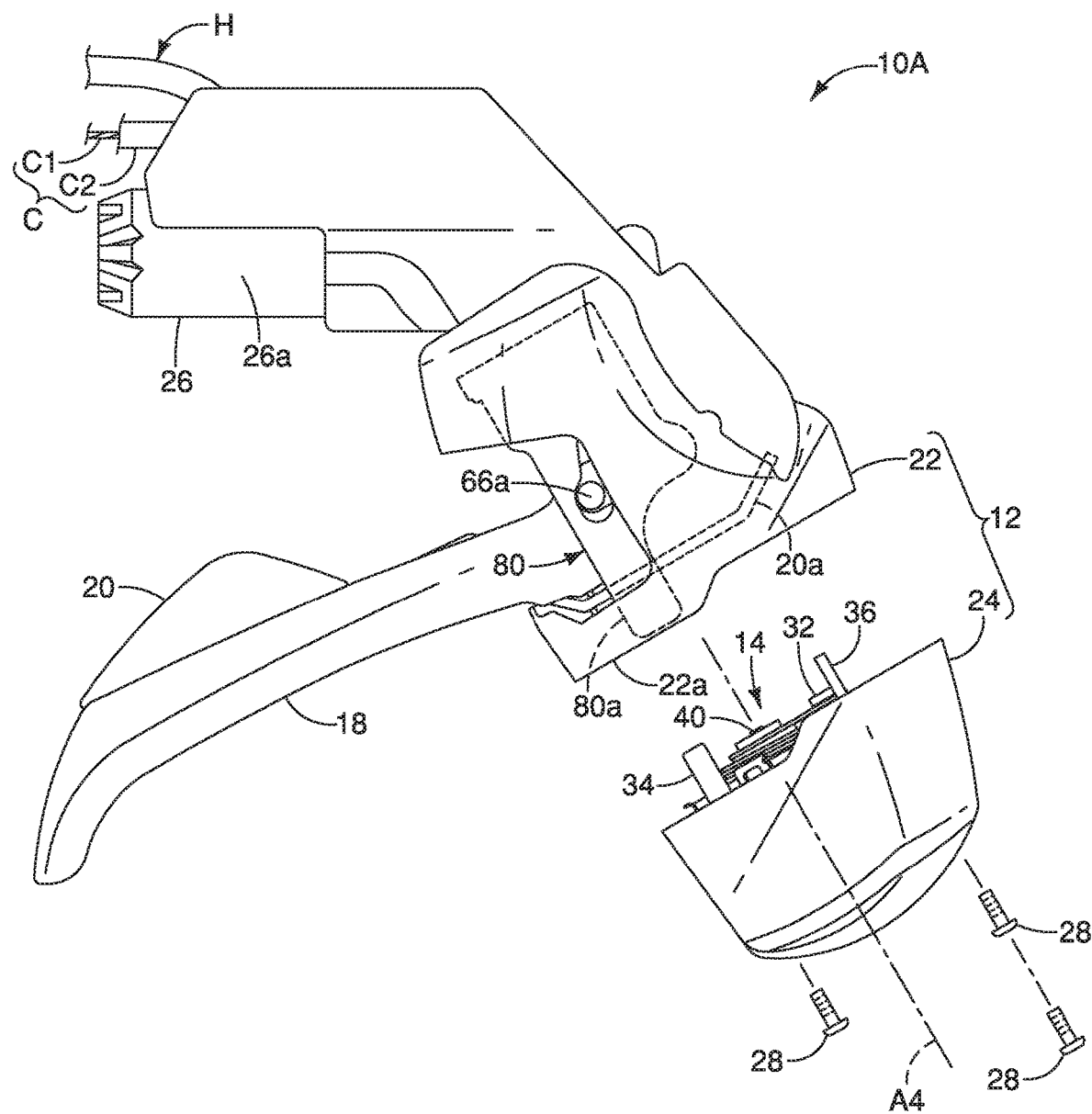
FIG. 11 is an outside elevational view of the right bicycle control device illustrated in FIGS. 1 to 10 with the attachment portion of the bracket detached from the base portion of the bracket so that the shift unit is detached from the base portion of the bracket.

Referring to FIGS. 7, 8 and 11, the base portion 22 of the bracket 12 has a distal end 22a that is at the opposite end of the base portion 22 of the bracket 12 from the coupling portion 26. The attachment portion 24 is configured to be removably attached to the distal end 22a of the base portion 22. The attachment portion 24 is configured to cover the shift unit 14. In particular, three screws 28 are used to removably attach the attachment portion 24 to the distal end 22a of the base portion 22 of the bracket 12. With this configuration, the shift unit 14 is mounted to the distal end 22a of the bracket 12 which is opposite to the mounting surface 26a. In other words, the attachment portion 24 is located at the distal end 22a of the bracket 12 with respect to the handlebar 2 in the state where the base portion 22 is mounted to the handlebar 2.

Figure 12:
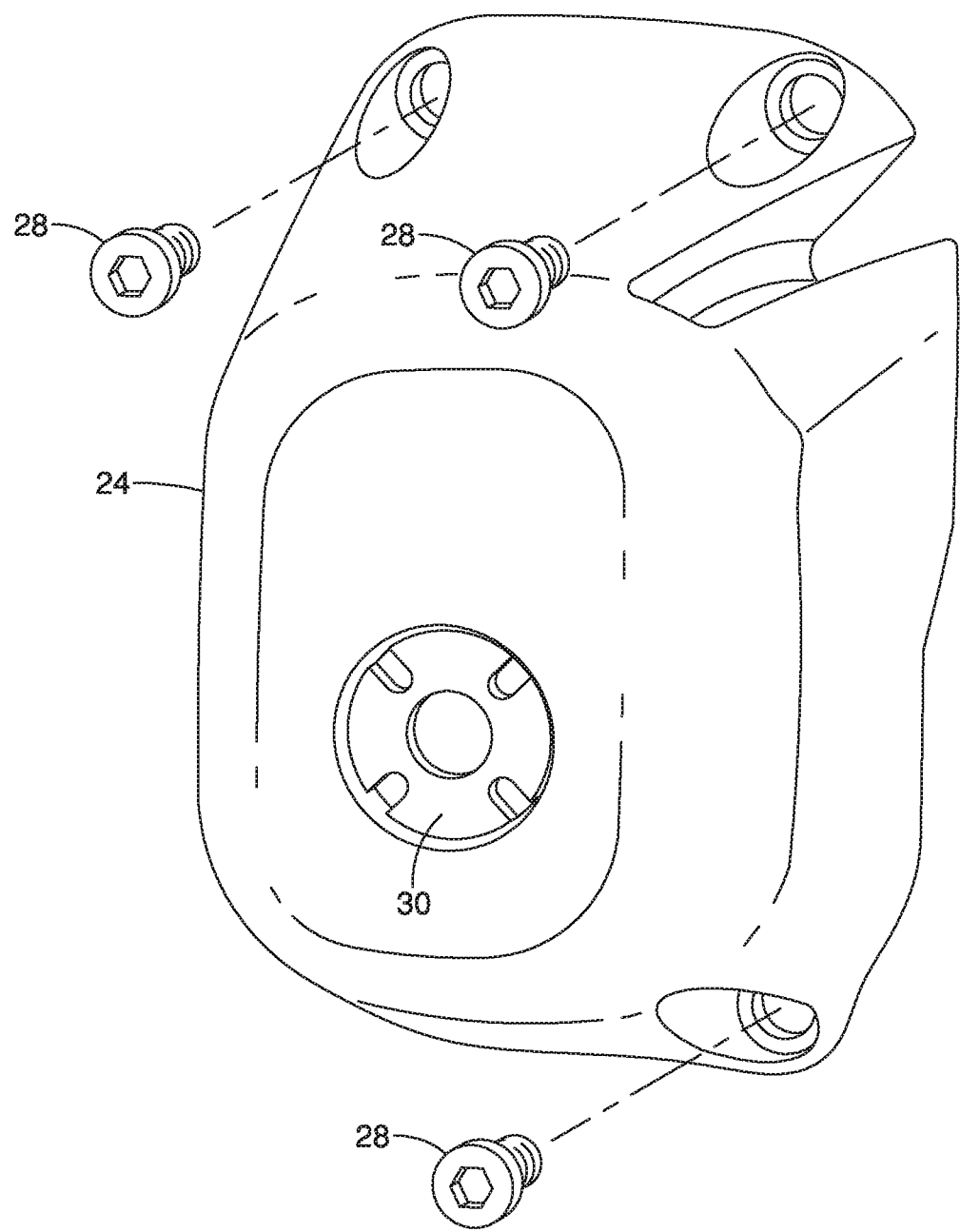
FIG. 12 is a front perspective view of the attachment portion of the right bicycle control device illustrated in FIGS. 1 to 11.
Figure 13:
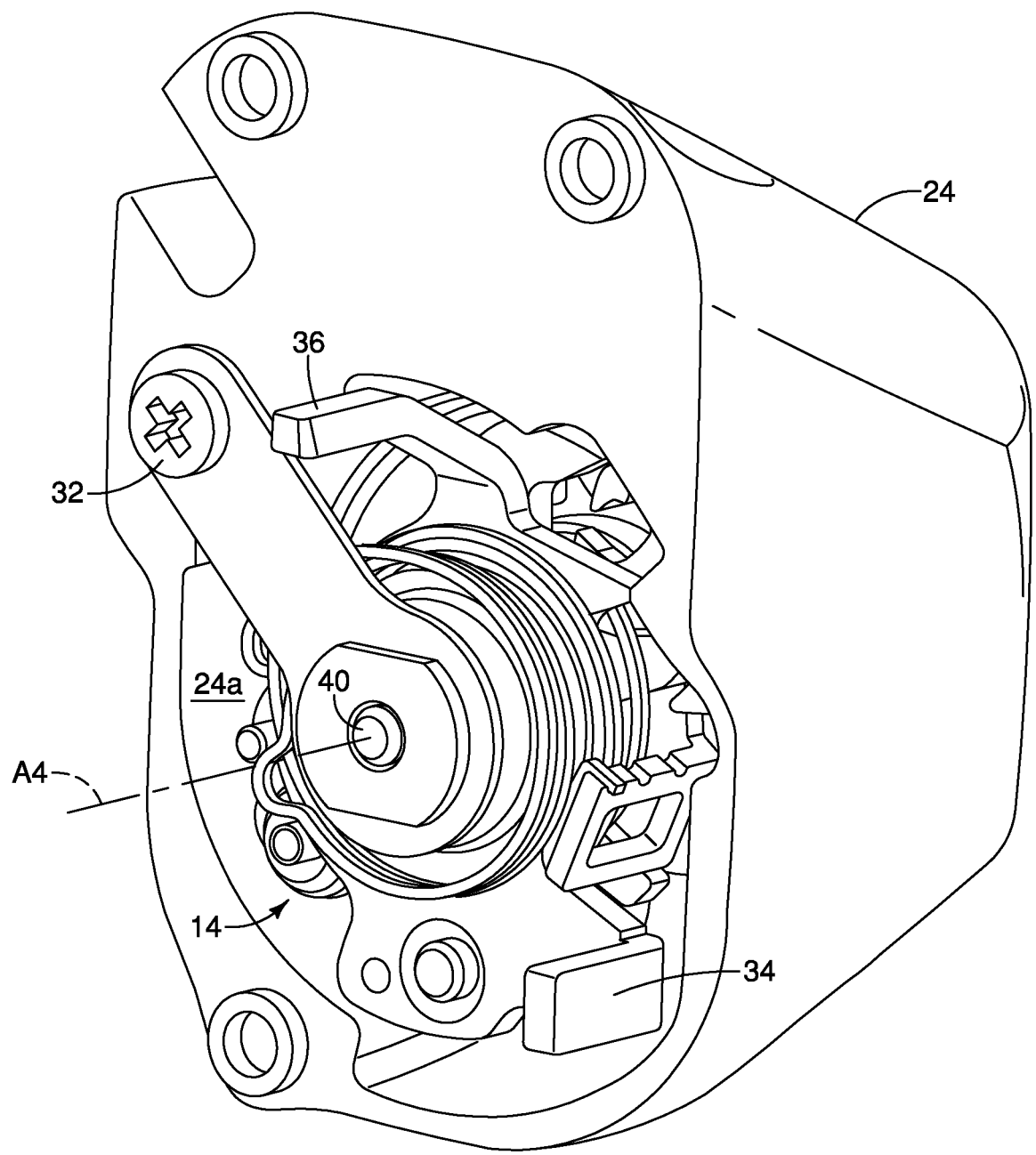
FIG. 13 is a rear perspective view of the attachment portion illustrated in FIG. 12 for the right bicycle control device illustrated in FIGS. 1 to 12.

As seen in FIGS. 11 to 13, the shift unit 14 is mounted to the attachment portion 24. As shown in FIG. 13, the attachment portion 24 includes a cavity 24a configured to at least partially enclose the shift unit 14. In particular, the shift unit 14 is secured to the attachment portion 24 by a nut 30 and a screw 32. In this way, the attachment portion 24 is removably mounted to the base portion 22 with the shift unit 14 being mounted to the attachment portion 24 as unit. In other words, when the screws 28 are removed, the shift unit 14 will be detached from the base portion 22 of the bracket 12, but will remain attached to the attachment portion 24.

Figure 9:
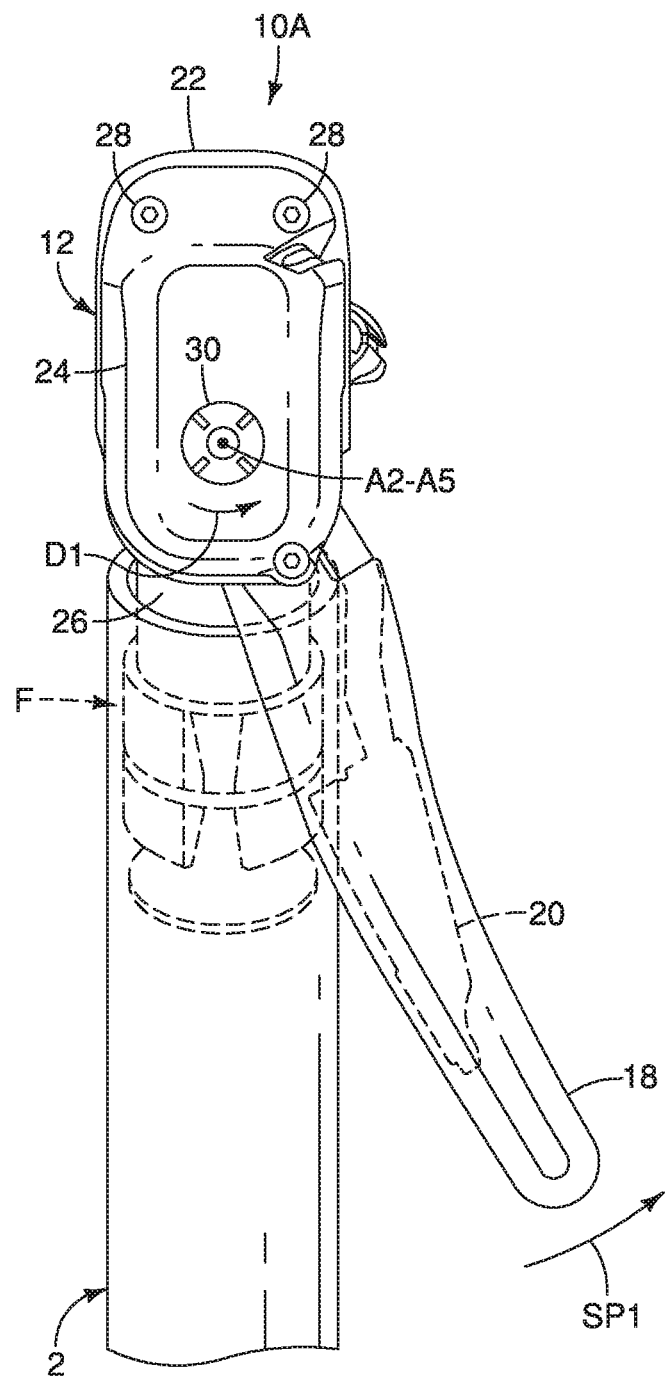
FIG. 9 is a front oblique view of the right bicycle control device illustrated in FIGS. 1 to 8 as viewed parallel to the take-up axis of the shift unit with the first operating member pivoted about the second pivot axis to a cable pulling position, which causes the second operating member to be pivoted together with the first operating member about the second pivot axis with respect to the bracket.
Figure 10:
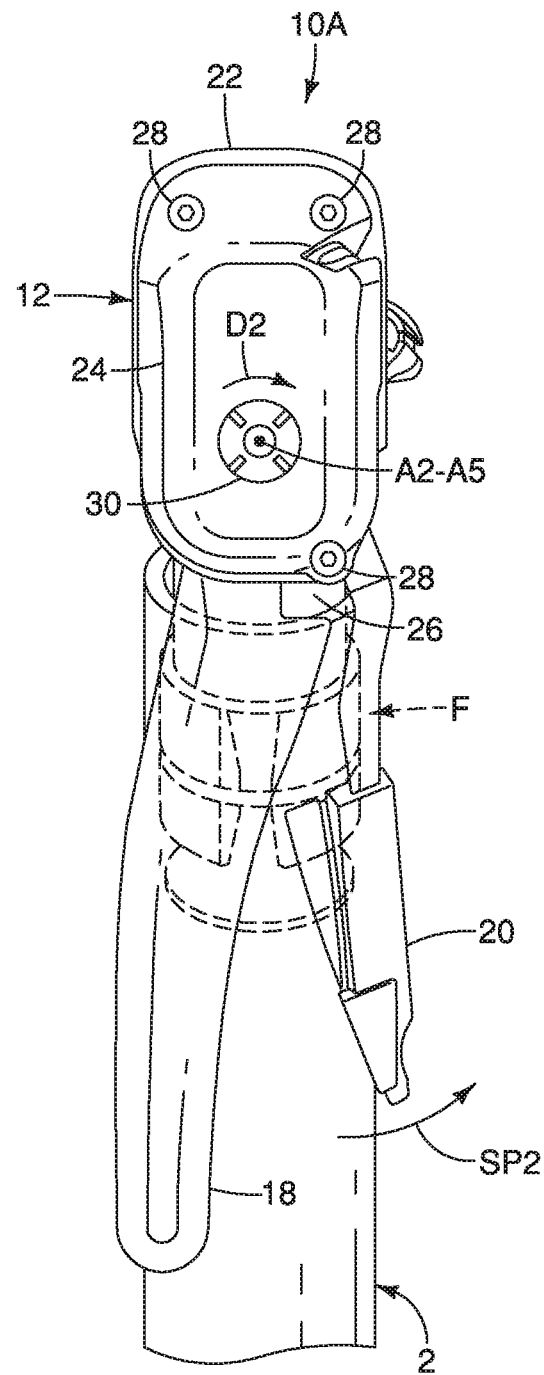
FIG. 10 is a front oblique view of the right bicycle control device illustrated in FIGS. 1 to 9 as viewed parallel to the take-up axis of the shift unit with the second operating member pivoted about the second pivot axis to a cable releasing position, in which the first operating member remains stationary with respect to the bracket.

Referring to FIGS. 8 to 10, the movements of the first and second operating members 18 and 20 will now be discussed. The first operating member 18 is pivotally mounted relative to the bracket 12 around a first pivot axis A1 to operate the hydraulic cylinder unit 16. The first operating member 18 is further configured to be pivoted around a second pivot axis A2 that is different from the first pivot axis A1 to actuate the shift unit 14. The second operating member 20 is pivotally mounted relative to the bracket 12 around a third pivot axis A3 to operate the shift unit 14. The third pivot axis A3 is coaxial with the second pivot axis A2. With this configuration, the first operating member 18 is configured to perform a braking operation when moved along a braking path BP (FIG. 5) generally parallel to a center longitudinal plane of the bicycle 1, and a cable pulling operation when moved along a first shifting path SP1 (FIG. 9) towards the center longitudinal plane of the bicycle 1. On the other hand, the second operating member 20 is configured to perform a cable releasing operation when moved along a second shifting path SP2 (FIG. 10) towards the center longitudinal plane of the bicycle 1. The shift unit 14 remains stationary as the first operating member 18 pivots with respect to the bracket 12 around the first pivot axis A1 to perform the braking operation.

As seen in FIGS. 7 and 13, the shift unit 14 is mounted to the attachment portion 24 of the bracket 12 to operate the first transmission (not shown), e.g. a front derailleur, a rear derailleur, or an internal transmission device. The shift unit 14 is operatively coupled to the first transmission via the control cable C. The control cable C is a conventional Bowden cable including an inner cable C1 and an outer casing C2 which at least partially covers the inner cable C1. The shift unit 14 is constructed as a mechanical shift unit that is configured to pull and release the inner cable C1 of the control cable C to operate the first transmission. The shift unit 14 pulls or releases the inner cable C1 in response to operation of the first and second operating members 18 and 20. Here, in the first embodiment, the operation of the first operating member 18 cause the shift unit 14 to pull the inner cable C1, while the operation of the second operating member 20 cause the shift unit 14 to release the inner cable C1.

Figure 16:
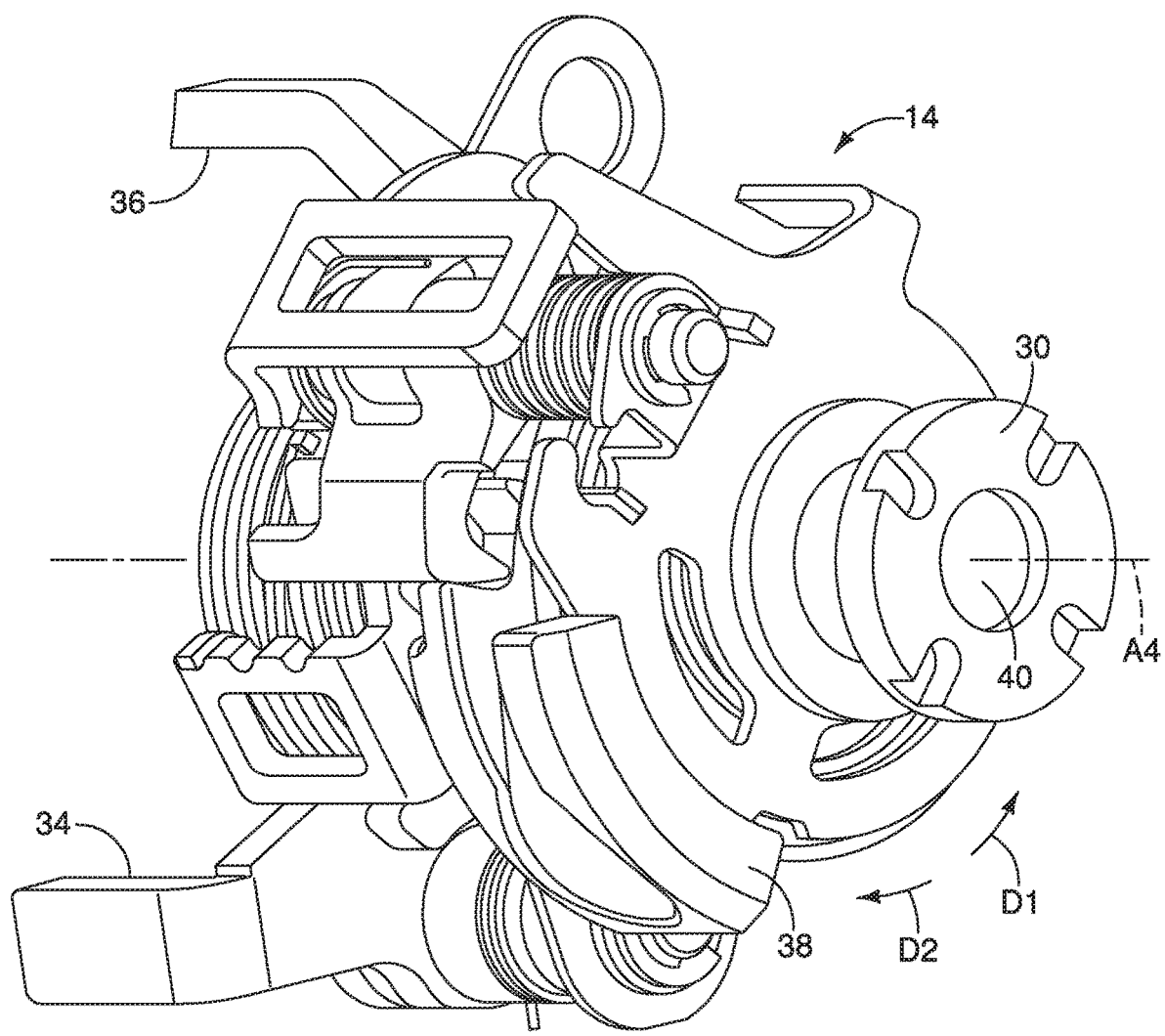
FIG. 16 is a front perspective view of shift unit of the right bicycle control device illustrated in FIGS. 1 to 11

Here, as seen in FIGS. 7 and 16, the shift unit 14 basically includes a first input member 34, a second input member 36 and a cable take-up member or spool 38. The cable take-up member 38 and the first and second input members 34 and 36 are coaxially arranged on a main shift axle 40 of the shift unit 14. The main shift axle 40 pivotally supports the take-up member 38 and the first and second input members 34 and 36 relative to the bracket 12 for pivotal movement. The main shift axle 40 defines a take-up axis A4 of the shift unit 14. Thus, the take-up member 38 is configured to be rotatable around the take-up axis A4 in response to operation of the first and second operating members 18 and 20. In the first embodiment, the take-up axis A4 is coaxial with the second pivot axis A2, Specifically, the take-up axis A4 is coaxial with the second and third pivot axes A2 and A3. Basically, the cable take-up member 38 rotates in opposite rotational directions about the take-up axis A4 in response to operation of the first and second input members 34 and 36.

More specifically, when the first operating member 18 is pivoted along the first shifting path SP1 towards the center longitudinal plane of the bicycle 1 (FIG. 9), the first operating member 18 causes the first input member 34 to pivot about the take-up axis A4. The pivotal movement of the first input member 34 causes the cable take-up member 38 to rotate in a first (cable pulling) direction D1 (FIG. 16). In particular, the first input member 34 has a pulling pawl that engages ratchet teeth of a pulling plate that is attached to the cable take-up member 38. Upon releasing the first operating member 18, the first input member 34 returns to its original rest position together with the first operating member 18. In this way, the shift unit 14 is configured to rotate the cable take-up member 38 in the first direction D1 about the cable take-up axis A4 as the first operating member 18 is moved from the rest position to the first shift position.

On the other hand, when second operating member 20 is pivoted along the second shifting path SP2 towards the center longitudinal plane of the bicycle 1 (FIG. 10), the second operating member 20 causes the second input member 36 to pivot about the take-up axis A4. The pivotal movement of the second input member 36 causes the cable take-up member 38 to rotate in a second (cable releasing) direction D2, which is opposite to the first (cable pulling) direction D1 with respect to the take-up axis A4 (FIG. 16). In particular, the second input member 36 has a release pawl that engages a tooth of a release plate that disengages a position maintaining pawl from one of a plurality of positioning teeth of a positioning plate that is attached to the cable take-up member 38. Preferably, the release plate engages a stopping pawl that selectively moves the stopping pawl from a non-stop or unrestricting position and a stop or restricting position. In the non-stop (rest) position, the stopping pawl is located out of the path of the positioning teeth of the positioning plate, and stop position, the stopping pawl is located in the path of the positioning teeth of the positioning plate to engage one of the positioning teeth of the positioning plate to restrict movement of the cable take-up member 38. Upon releasing the second operating member 20, the second input member 36 returns to its original rest position together with the second operating member 20. In this way, the shift unit 14 is configured to rotate the cable take-up member 38 in the second direction D2 about the cable take-up axis A4 as the second operating member 20 is moved from the rest position to the second shift position. The second direction is opposite to the first direction.

Since mechanical shift units, similar to the shift unit 14, are conventional and well known within the bicycle field, the shift unit 14 will not be described and/or illustrated in further detail herein for the sake of brevity. Basically, the shift unit 14 basically operates to pull and release the cable C1 in response to operation of the first and second operating members 18 and 20 in the same manner as the shift operating unit that is described in U.S. Patent Application Publication No. 2012/0297919. However, the mounting of the shift unit 14 to the bracket 12 is different from the shift control mechanism disclosed in this U.S. Patent Publication. Also the shift unit 14 further differs from the operating unit disclosed in this U.S. Patent Publication in that the first and second operating members 18 and 20 are located rearward of the shift unit 14.

As seen in FIG. 7, the hydraulic cylinder unit 16 is mounted to the bracket 12 to operate a hydraulic braking device (not shown), e.g. a hydraulic disc brake or a hydraulic rim brake. The hydraulic cylinder unit 16 is mounted to the bracket 12 at a location that is closer to the handlebar 2 than the shift unit 14 in a state where the bicycle control device 10A is mounted to the handlebar 2. Thus, the hydraulic cylinder unit 16 is mounted to the bracket 12 in a location that is closer to the coupling portion 26 than the shift unit 14. Also with this arrangement, the hydraulic cylinder unit 16 is mounted to the bracket 12 so as to be disposed between the mounting surface 26a and the shift unit 14 without overlapping with the shift unit 14 in any direction perpendicular to the longitudinal center axis A5 of the hydraulic cylinder unit 16.

Basically, the hydraulic cylinder unit 16 includes a hydraulic cylinder 62 and a piston 64. The hydraulic cylinder 62 defines a longitudinal center axis A5. The piston 64 is movably disposed in the hydraulic cylinder 62 along the longitudinal center axis A5. Preferably, the hydraulic cylinder unit 16 is detachably mounted to the bracket 12 so as to be detached and reattached to the bracket 12. In the first embodiment, hydraulic cylinder 62 of the hydraulic cylinder unit 16 is detachably mounted to the bracket 12 by a screw 60 (FIG. 7). In the first embodiment, the hydraulic cylinder 62 is disposed in a recess of the base portion 22 of the bracket 12. A piston rod 66 operatively connects the first operating member 18 to the piston 64 such that pivotal movement of the first operating member 18 around the first pivot axis A1 cause the piston 64 to move from a rest position (FIG. 4) to an actuated position (FIG. 5) along the longitudinal center axis A5. The first operating member 18 is pivotally connected to a first end of the piston rod 66 by a pivot pin 66a. The piston rod 66 has a second end with a partially spherical convex surface that contacts a partially spherical concave surface of the end of the piston 64. In this way, the piston rod 66 is pivotally connected to the piston 64. In this way, the first operating member 18 is connected to the piston 64 that is disposed in the hydraulic cylinder unit 16 to move the piston 64 as the first operating member 18 is pivoted around the first pivot axis A1.

Figure 5:
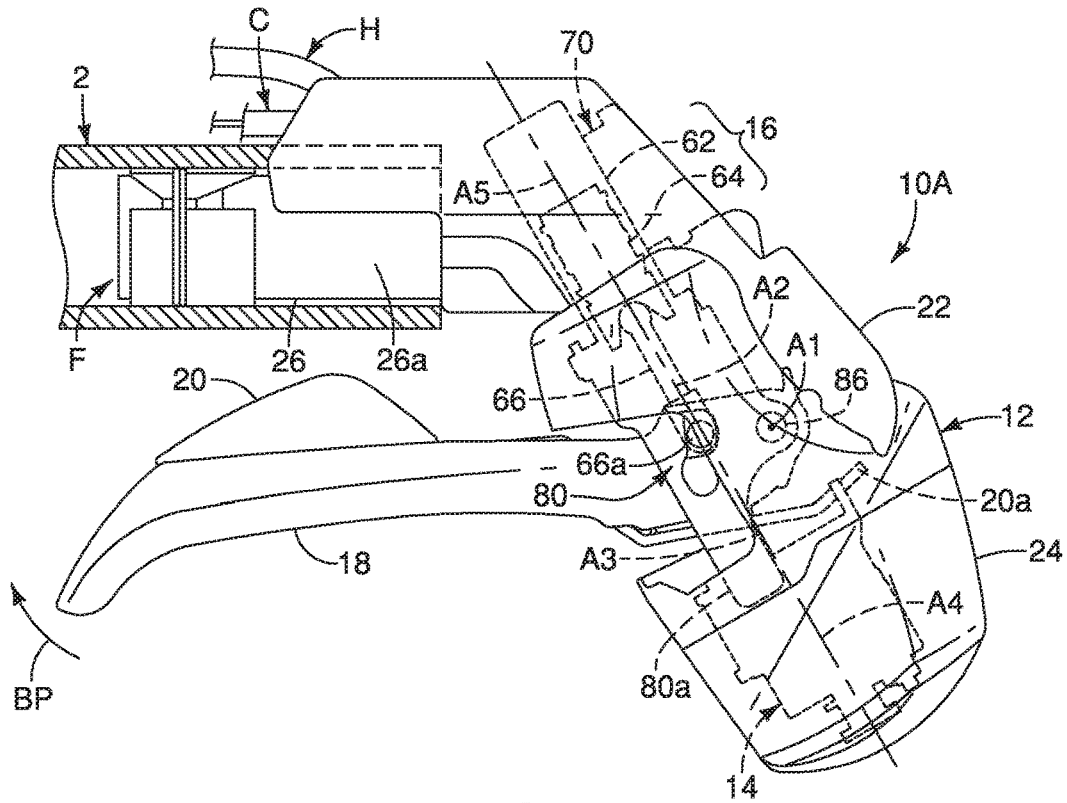
FIG. 5 is an outside elevational view, similar to FIG. 4, of the right bicycle control device, but with the first operating member (i.e., the brake-shift cable pull lever) pivoted about the first pivot axis to the braking position, which causes the second operating member (i.e., the shift cable release lever) to be pivoted together with the first operating member about the first pivot axis with respect to the bracket.
Figure 6:
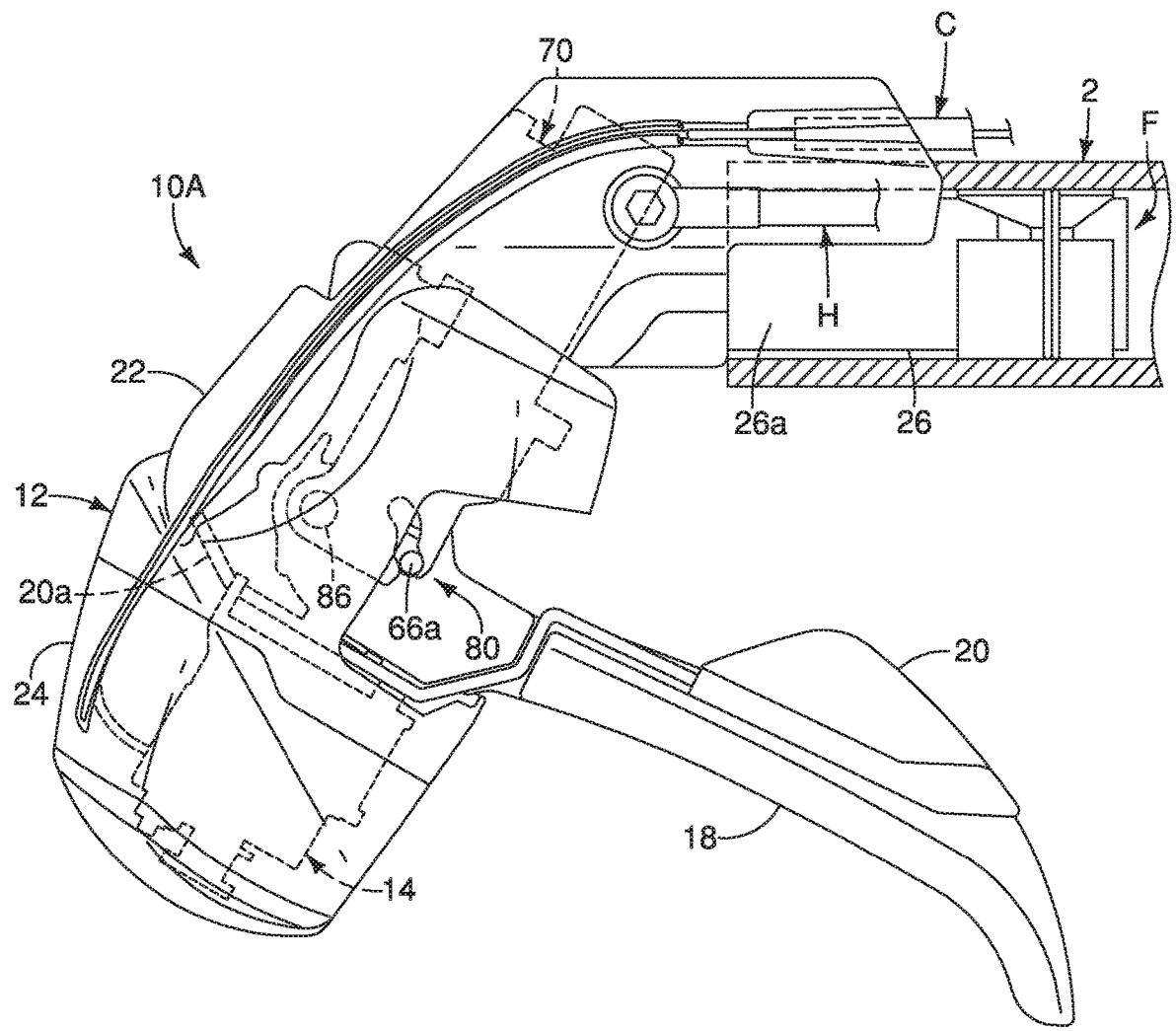
FIG. 6 is an enlarged inside elevational view of the right bicycle control device illustrated in FIGS. 1 to 5 with the first and second operating members in their rest positions.

The piston 64 is movably arranged in the hydraulic cylinder 62 for reciprocal movement along the longitudinal center axis A5. As seen in FIG. 7, the hydraulic cylinder 62 of the hydraulic cylinder unit 16 has a fluid outlet 62a that is located adjacent to the mounting surface 26a. The hydraulic cylinder 62 is in fluid communication with the hydraulic braking device (not shown) via the hydraulic hose H to operate the hydraulic braking device in response to movement of the piston 64 from the rest position (FIG. 4) to the actuated position (FIG. 5). The hydraulic cylinder unit 16 further includes a biasing element 68 that is disposed inside the hydraulic cylinder 62 between a closed end wall of the hydraulic cylinder 62 and the piston 64. The biasing element 68 biases the piston 64 to a non-braking position. The biasing element 68 also acts as a return spring for biasing the first operating member 18 to its rest position with respect to first pivot axis A1. Here, the biasing element 68 is a coil compression spring.

As seen in FIG. 7, the bicycle control device 10A further comprises a reservoir unit 70 that fluidly communicates with the interior of the hydraulic cylinder 62 of the hydraulic cylinder unit 16. The reservoir unit 70 is detachably mounted to the bracket 12 so as to be detached and reattached to the bracket 12. In particular, the reservoir unit 70 is fastened to the bracket 12 by a pair of screws 72. The reservoir unit 70 basically comprises a reservoir tank 70a, a reservoir cap 70b and a diaphragm 70c. The reservoir tank 70a fluidly communicates with the interior of the hydraulic cylinder 62 via a pair of ports. In the first embodiment, the reservoir unit 70 is disposed in a recess of the base portion 22 of the bracket 12. The recess in the base portion 22 for the reservoir unit 70 intersects with the recess in the base portion 22 for the hydraulic cylinder 62. In this way, the inlet ports of the hydraulic cylinder 62 mates with the outlet ports of the reservoir tank 70a so that hydraulic fluid is supplied from the reservoir unit 70 to the hydraulic cylinder 62 before the piston 64 is pushed in response to the operation of the first operating member 18 about the first pivot axis A1.

Figure 14:
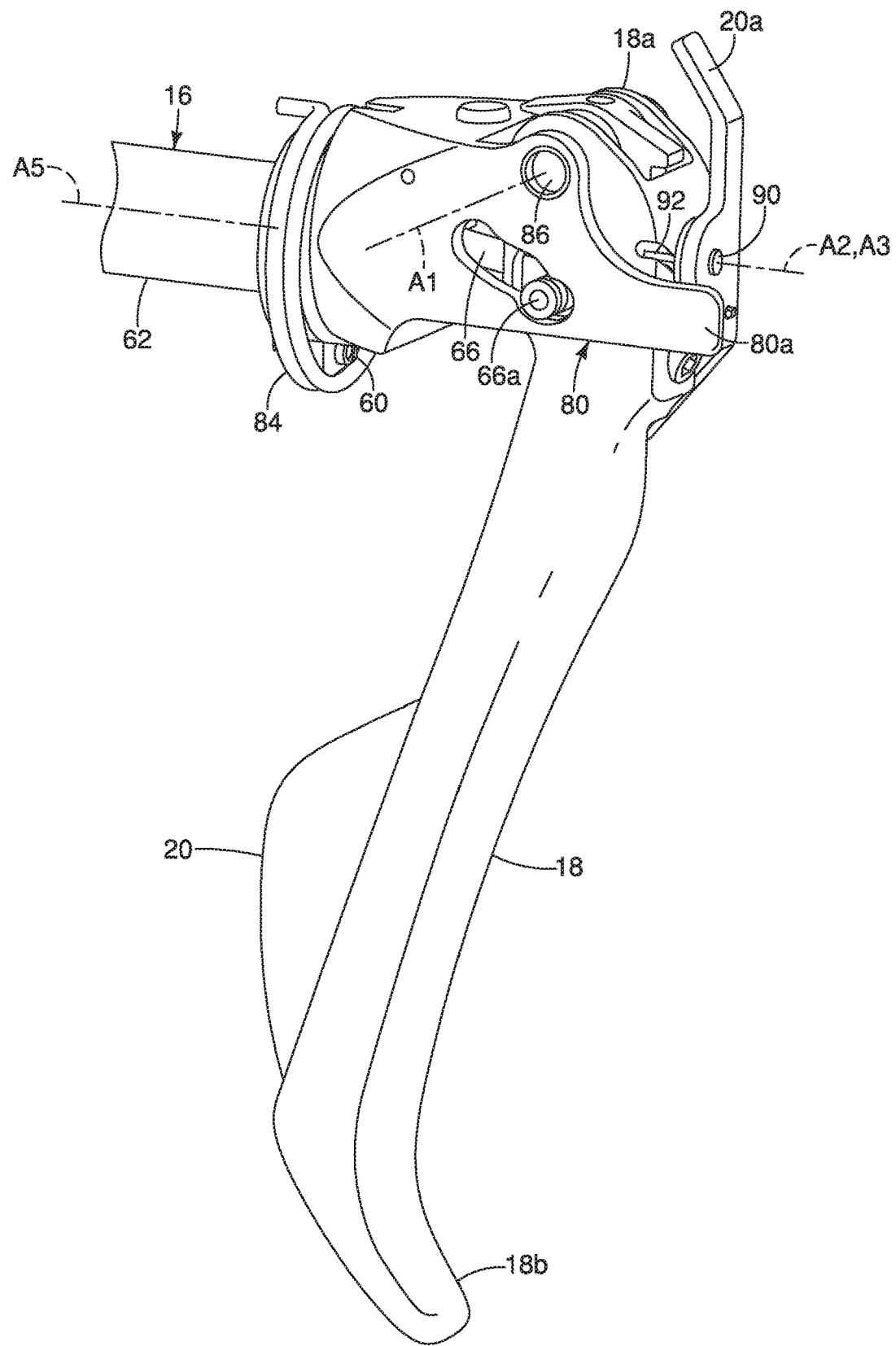
FIG. 14 is an outside perspective view of the actuating unit (the first and second operating members and the attachment member) of the right bicycle control device illustrated in FIGS. 1 to 11.
Figure 15:
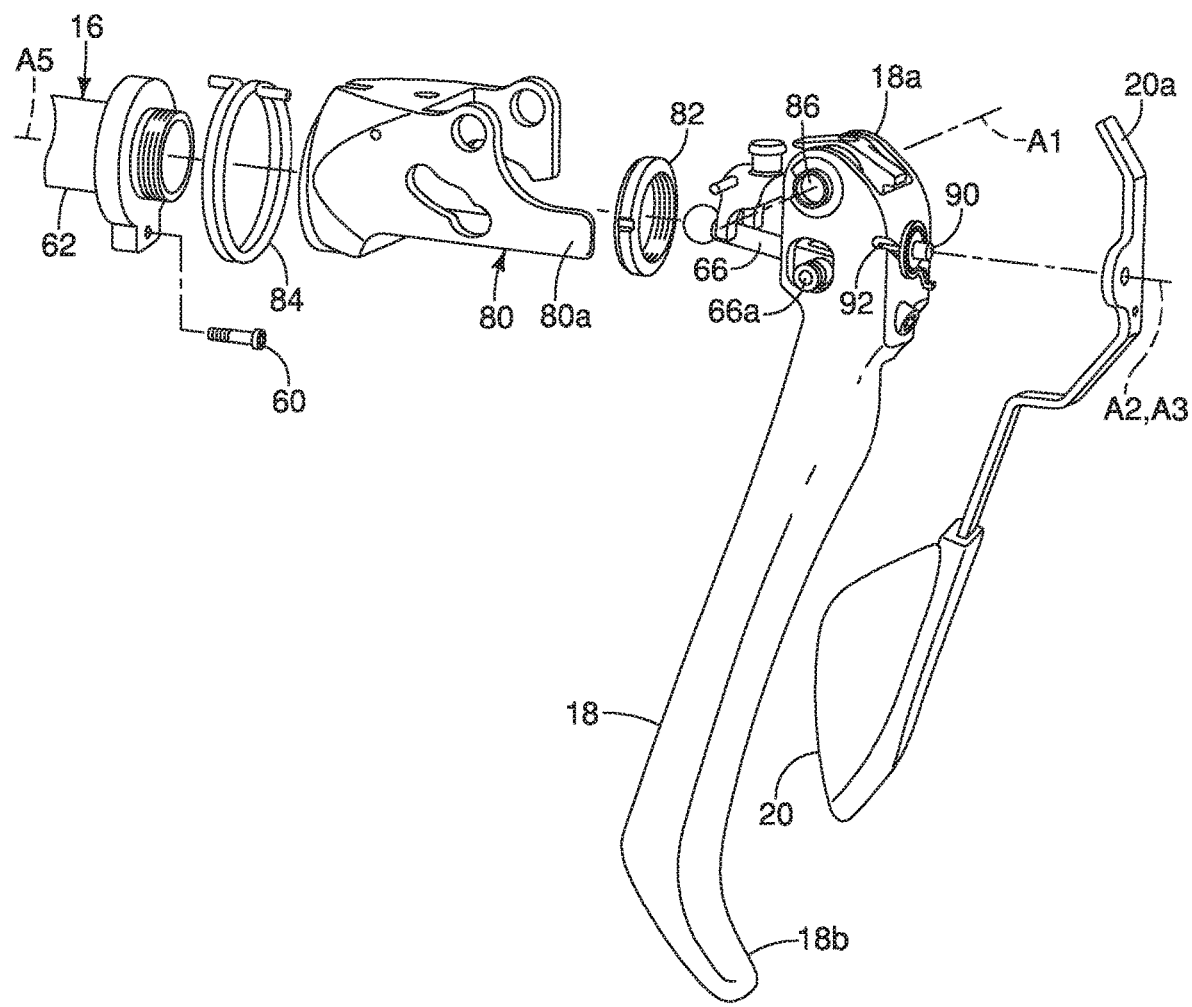
FIG. 15 is a partially exploded perspective view of the actuating unit illustrated in FIG. 14 for the right bicycle control device illustrated in FIGS. 1 to 11.

As seen in FIGS. 7, 14 and 15, the bicycle control device 10A further comprises an attachment member 80. The attachment member 80 supports the first and second operating members 18 and 20 to the bracket 12. Thus, the first and second operating members 18 and 20 and the attachment member 80 form an actuating unit of the bicycle control device 10A. The attachment member 80 is pivotally coupled to the hydraulic cylinder unit 16 around the second pivot axis A2. In particular, the attachment member 80 is pivotally secured to the hydraulic cylinder 62 of the hydraulic cylinder unit 16 by a nut 82. Thus, the attachment member 80 defines the second pivot axis A2. The longitudinal center axis A5 of the hydraulic unit 16 is coaxial with the second pivot axis A2. Further, the take-up axis A4 of the take-up member 38 is coaxial with the second pivot axis A2 (FIG. 7). The attachment member 80 has an actuating part 80a. The actuating part 80a is arranged to contact the first input member 34 of the shift unit 14 (FIG. 16) as the attachment member 80 pivots from the rest position to the operated position about the second pivot axis A2. Thus, the attachment member 80 causes the cable take-up member 38 to rotate in the first (cable pulling) direction D1 in response to the operation of the first operating member 18.

A biasing element 84 is operatively disposed between the attachment member 80 and the bracket 12 to bias the attachment member 80 to its rest position. Here, the biasing element 84 is a torsion spring with a first end disposed in a hole in the base portion 22 of the bracket 12 and a second end disposed in a recess in the attachment member 80. The biasing element 84 biases the attachment member 80 against the base portion 22 of the bracket 12 to establish the rest position of the attachment member 80. The biasing element 84 also acts as a return spring for biasing the first operating member 18 to its rest position with respect to the second pivot axis A2.

As seen in FIGS. 7, 14 and 15, the first operating member 18 will be discussed in more detail. The first operating member 18 is a trigger lever that is held in the rest position by the biasing elements 68 and 84. As mentioned above, the first operating member 18 pivots around the first pivot axis A1 to operate the hydraulic cylinder unit 16 and around the second pivot axis A2 to operate the shift unit 14. As seen in FIG. 7, the first pivot axis A1 is disposed between the shift unit 14 and the coupling portion 26. Also the first pivot axis A1 is disposed between the shift unit 14 and the hydraulic cylinder unit 16.

As seen in FIGS. 14 and 15, the first operating member 18 has a mounting portion 18a and a distal free end portion 18b. The mounting portion 18a has the first pivot axis A1 The distal free end portion 18b is spaced apart from the bracket 12. The first pivot axis A1 is located on a first side of the center longitudinal axis A5 of the hydraulic cylinder unit 16. The distal free end portion 18b is located on a second side of the center longitudinal axis A5 of the hydraulic cylinder unit 16 as viewed in a direction parallel to the first pivot axis A1. The first pivot axis A1 is also arranged such that the longitudinal center axis A5 of the hydraulic cylinder unit 16 extends between the first pivot axis A1 and the distal end portion 18b.

The first operating member 18 is pivotally mounted to the attachment member 80 around the first pivot axis A1 via a pivot axle 86. The pivot axle 86 defines the first pivot axis A1. The first pivot axis A1 is disposed between the shift unit 14 and the coupling portion 26 of the bracket 12 along the longitudinal center axis A5 or with respect to a longitudinal direction of the cylinder 62. Thus, the first operating member 18 is arranged between the hydraulic cylinder unit 16 and the shift unit 14. The first operating member 18 is connected to the piston 64 that is disposed in the hydraulic cylinder unit 16 to move the piston 64 as the first operating member 18 is pivoted around the first pivot axis A1. Also since the first operating member 18 is mounted on the attachment member 80, the first operating member 18 pivots with the attachment member 80 about the second pivot axis A2 to perform a shifting operation.

As seen in FIGS. 7, 14 and 15, the second operating member 20 is pivotally mounted on the first operating member 18 around the third pivot axis A3. In particular, the second operating member 20 mounted to the first operating member 18 by a pivot axle 90. The pivot axle 90 defines the third pivot axis A3, which is coaxial with the second pivot axis A2. The second operating member 20 has an actuating part 20a. The actuating part 20a is arranged to contact the second input member 36 of the shift unit 14 (FIG. 16) as the second operating member 20 pivots from the rest position to the operated position about the third pivot axis A3. Thus, the second operating member 20 causes the cable take-up member 38 to rotate in the second (cable releasing) direction D2 in response to the operation of the second operating member 20.

A biasing element 92 is operatively disposed between the first and second operating members 18 and 20 to bias the second operating member 20 towards its rest position against the first operating member 18. Here, the biasing element 92 is a torsion spring with a first end disposed in a hole in the first operating member 18 and a second end hooked onto the second operating member 20. The biasing element 92 biases the second operating member 20 against the first operating member 18 to establish the rest position of the second operating member 20. In this way, the attachment member 80 supports the first and second operating members 18 and 20 to the bracket 12.

In the first embodiment, with the above described arrangement of the hydraulic cylinder unit 16 being closer to the handlebar 2 than the shift unit 14, the bracket 12 can be thin and small in size were the rider is gripping the bracket 12.

Figure 17:
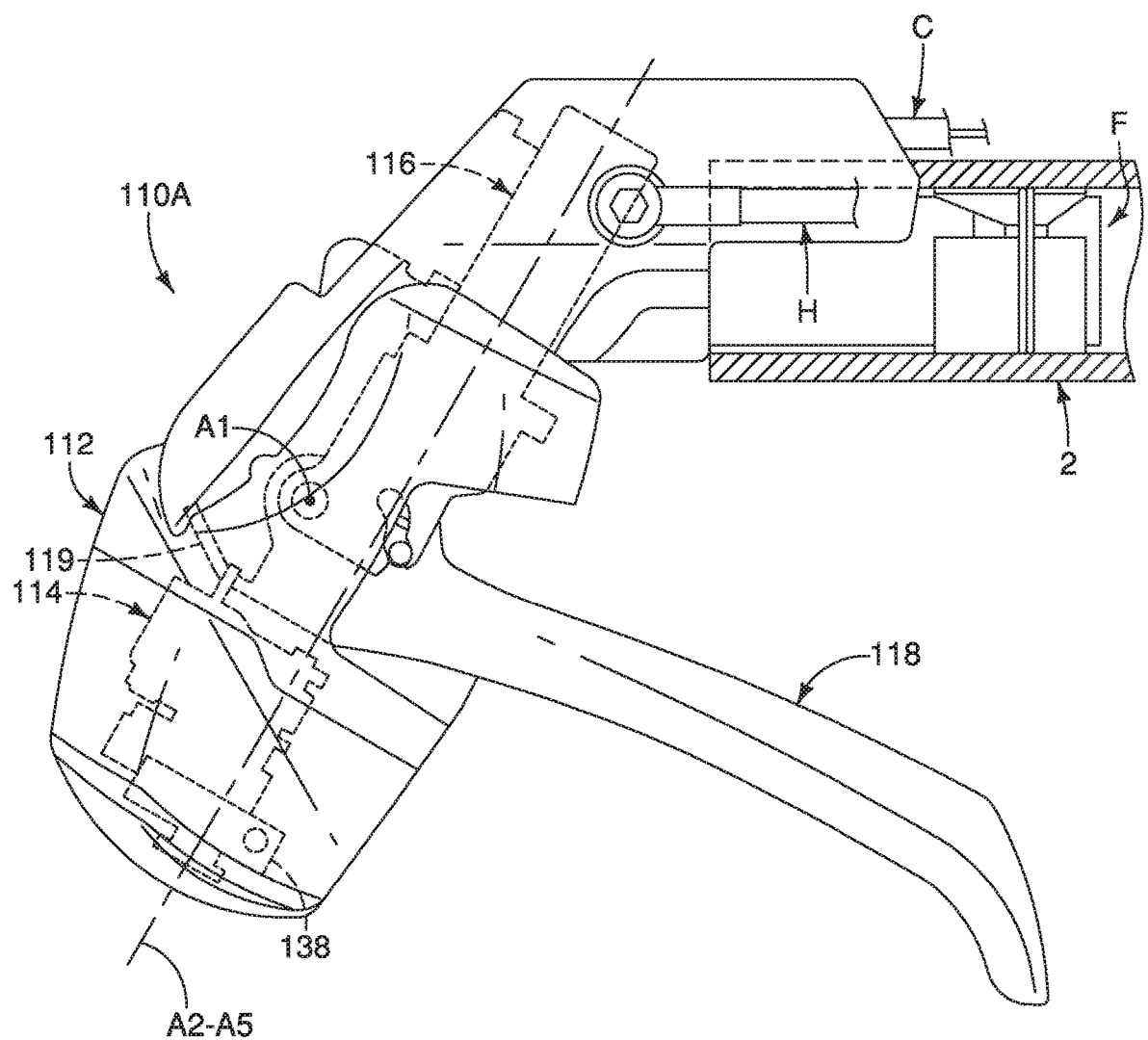
FIG. 17 is an inside perspective view of a right bicycle control device having a single operating member that performs a braking operation, a cable pulling operation and a cable releasing operation in accordance with a second embodiment with the bicycle control device attached to the right free end of the handlebar illustrated in FIG. 1.
Figure 18:
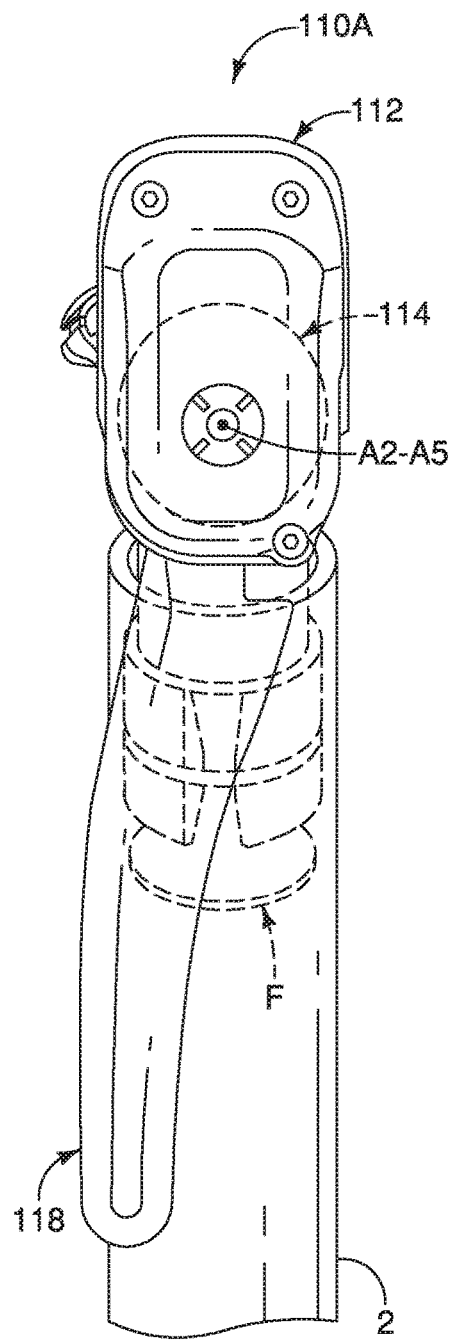
FIG. 18 is a front oblique view of the right bicycle control device illustrated in FIG. 17 as viewed parallel to the take-up axis of the shift unit with the first operating member in its rest position.
Figure 19:
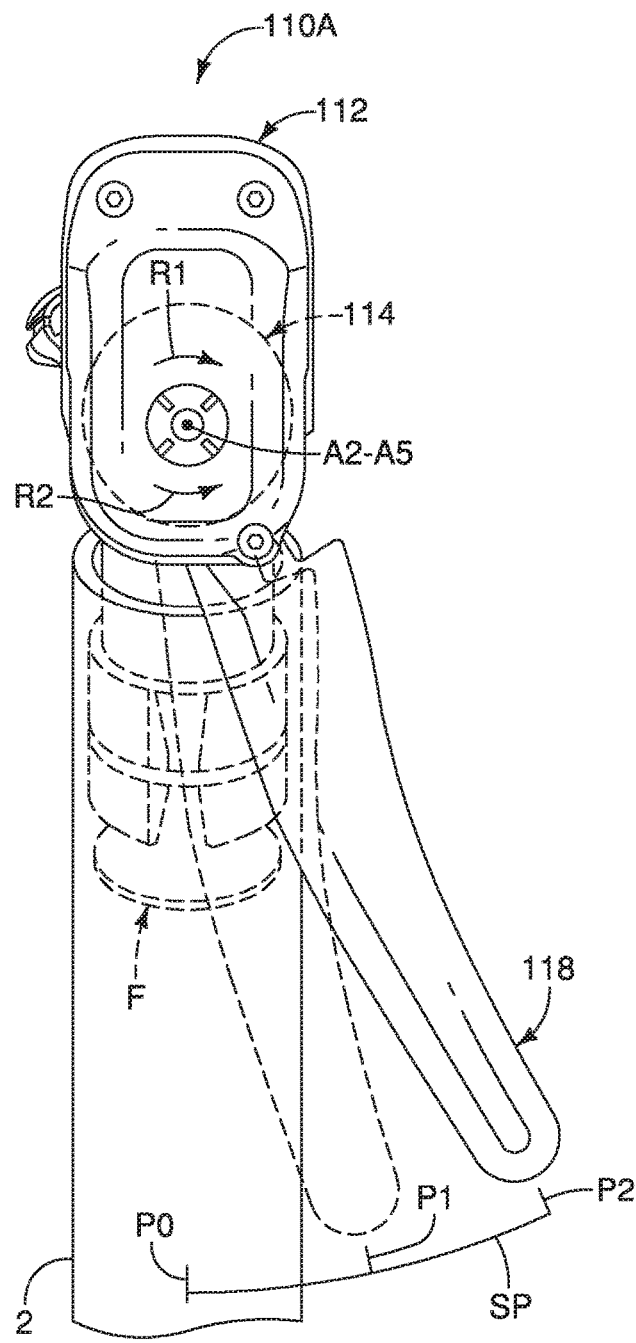
FIG. 19 is a front oblique view of the right bicycle control device illustrated in FIGS. 17 and 18 as viewed parallel to the take-up axis of the shift unit with the first operating member pivoted about the second pivot axis along a shifting path.

Referring now to FIGS. 17 to 19, a right bicycle control device 110A is illustrated in accordance with a second embodiment. The bicycle control device 110A preferably includes a bracket 112, a shift unit 114, a hydraulic cylinder unit 116 and a first operating member 118. The bracket 112 is mounted to the handlebar 2 in the same manner as the first embodiment, and includes a gripping portion that is defined by the portions of the bracket 112 rearward of the first operating member 118, except for the coupling portion. The hydraulic cylinder unit 116 is identical to the hydraulic cylinder unit 16 of the first embodiment.

Here, in the second embodiment, the bicycle control device 110A does not have a second operating member. Rather, the first (single) operating member 118 performs a braking operation, a cable pulling operation and a cable releasing operation. The shift unit 114 basically operates to pull and release the cable C1 in response to operation of the first operating member 118 in the same manner as the shift control mechanism that is described in U.S. Patent Application Publication No, 2010/0083788. However, the mounting of the shift unit 114 to the bracket 112 is different from the shift control mechanism disclosed in this U.S. Patent Publication. Also the shift unit 114 further differs from the shift control mechanism disclosed in this U.S. Patent Publication in that the shift unit 114 operates the hydraulic cylinder unit 116.

As seen in FIG. 17, the first operating member 118 is provided with an actuating portion 119 that operates the shift unit 114 upon pivotal movement of the first operating member 118. As seen in FIGS. 18 and 19, the first operating member 118 is configured to pivot along a shifting path SP from a rest position P0 to a first shift position P1 to actuate the shift unit 114. The first operating member 118 is configured to be moved further along the shifting path SP from the rest position P0 past the first position P1 to a second shift position P2 to actuate the shift unit 114.

Here, with the shift unit 114, a cable take-up member or spool 138 is rotated in a first direction R1, which corresponds to a cable releasing direction, upon the first operating member 118 reaching the first shift position P1, but not being moved past the first shift position P1 and then subsequently being released in a single stroke of the first operating member 118. However, with the shift unit 114, the cable take-up member 138 is rotated in a second direction R2, which corresponds to a cable pulling direction, upon the first operating member 118 being progressively move towards and reaching the second shift position P2 in a single stroke of the first operating member 118. The second direction R2 is opposite to the first direction R1.

Referring now to FIGS. 20 to 30, a portion of a road bicycle 201 is illustrated having a handlebar 202 with a pair of bicycle control devices 210A and 210B in accordance with a third embodiment. The bicycle control devices 210A and 210B are configured to be mounted to opposite ends of the handlebar 202, respectively. Here in the third embodiment, the handlebar 202 is a drop handlebar in which the bicycle control devices 210A and 210B are attached to curved sections 202*a* and 202*b*, respectively. Thus, each of the bicycle control devices 210A and 210B is a drop handlebar control device, which means that they are configured to be mounted to a curved section of a drop handlebar.

Figure 20:
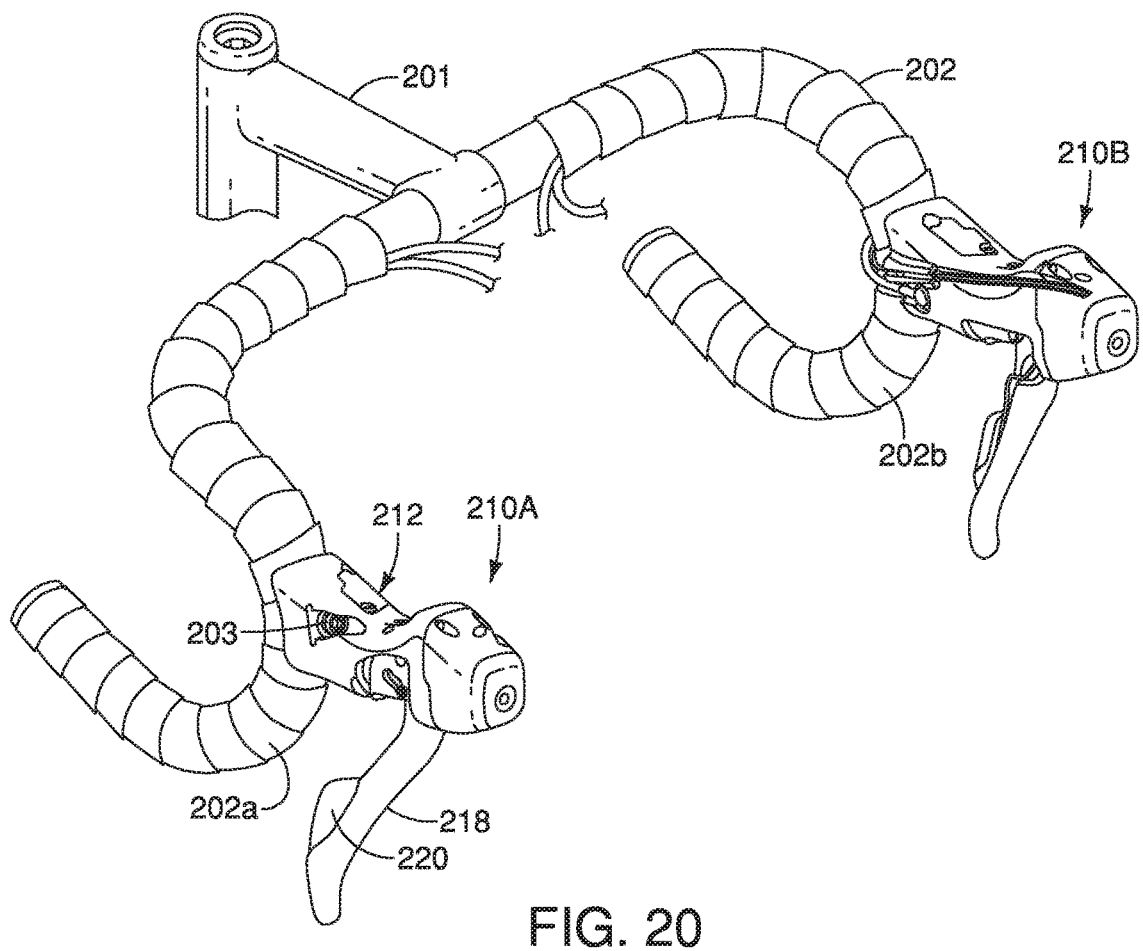
FIG. 20 is a partial front perspective view of a road bicycle having a drop handlebar that is equipped with a pair of bicycle control devices in accordance with a third embodiment.

Basically, as seen in FIG. 20, the bicycle control device 210A is a right hand side control device that is operated by the rider's right hand to actuate a first hydraulic brake device (not shown) and a first transmission (not shown). The bicycle control device 210B is a left hand side control device that is operated by the rider's left hand to actuate a second hydraulic brake device (not shown) and a second transmission (not shown). Similar to the prior embodiments, the bicycle control devices 210A and 210B are operatively coupled to their hydraulic brake devices (not shown) via hydraulic brake hoses H, and to the transmissions (not shown) via control cables C.

Since the bicycle control devices 210A and 2109 are each configured to operate both a transmission and a hydraulic brake device, the bicycle control devices 210A and 210B are also known as bicycle brifters. In other words, a bicycle brifter is a device that includes both a braking function and a shifting function in a single unit that is mounted to the bicycle. In the illustrated embodiment, the right and left bicycle control devices 210A and 210B are essentially identical in operation, except that they are mirror images of each other and they may have a different number of shift operations. Thus, only the bicycle control device 210A will be discussed and illustrated herein.

The right bicycle control device 210A preferably includes a bracket 212, a shift unit 214, a hydraulic cylinder unit 216 and a first operating member 218. Preferably, in the third embodiment, the bicycle control device 210A further includes a second operating member 220. The bracket 212, the shift unit 214, the hydraulic cylinder unit 216, the first operating member 218 and the second operating member 220 are configured and arranged to form pivot axes A1 to A5 of the same arrangement as in the bicycle control device 10A of the first embodiment.

The bracket 212 is configured to be mounted to the curved section 202*a* of the handlebar 202, instead of being inserted into the end opening of a handlebar. The shift unit 214 is identical to the shift unit 14 of the first embodiment. The hydraulic cylinder unit 216 is identical to the hydraulic cylinder units 16 and 116 of the prior embodiments. The first operating member 218 operates the hydraulic cylinder unit 216 in the same manner as the first embodiment. The first and second operating members 218 and 220 operate the shift unit 214 in the same manner as the first embodiment. In other words, only the bracket 212 of the bicycle control device 210A differs from the bicycle control device 10A. Thus, for the sake of brevity, the bicycle control device 210A will not be discussed in as much detail as the first embodiment.

Figure 21:
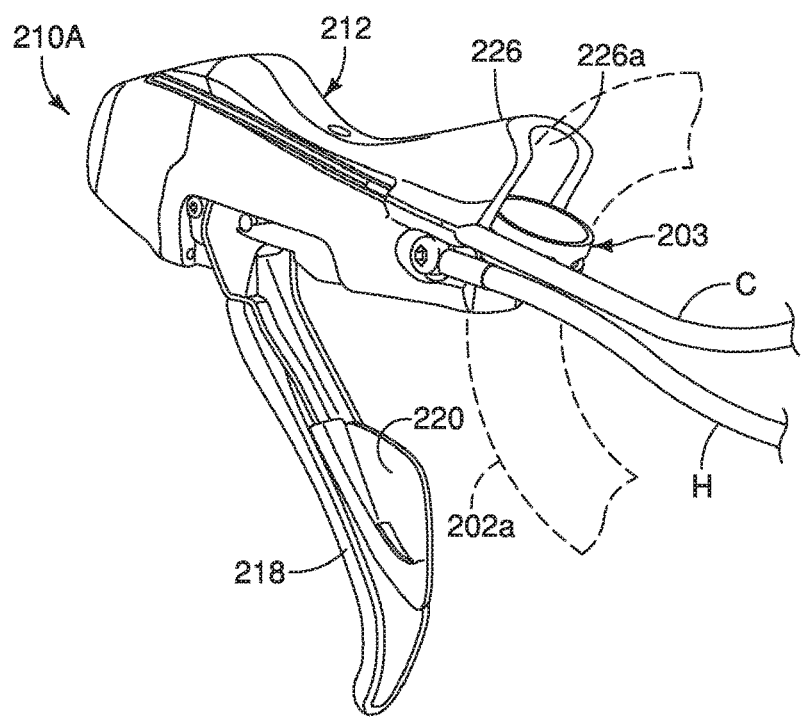
FIG. 21 is an inside perspective view of the right bicycle control device that is attached to a curved portion of the handlebar illustrated in FIG. 20.
Figure 22:
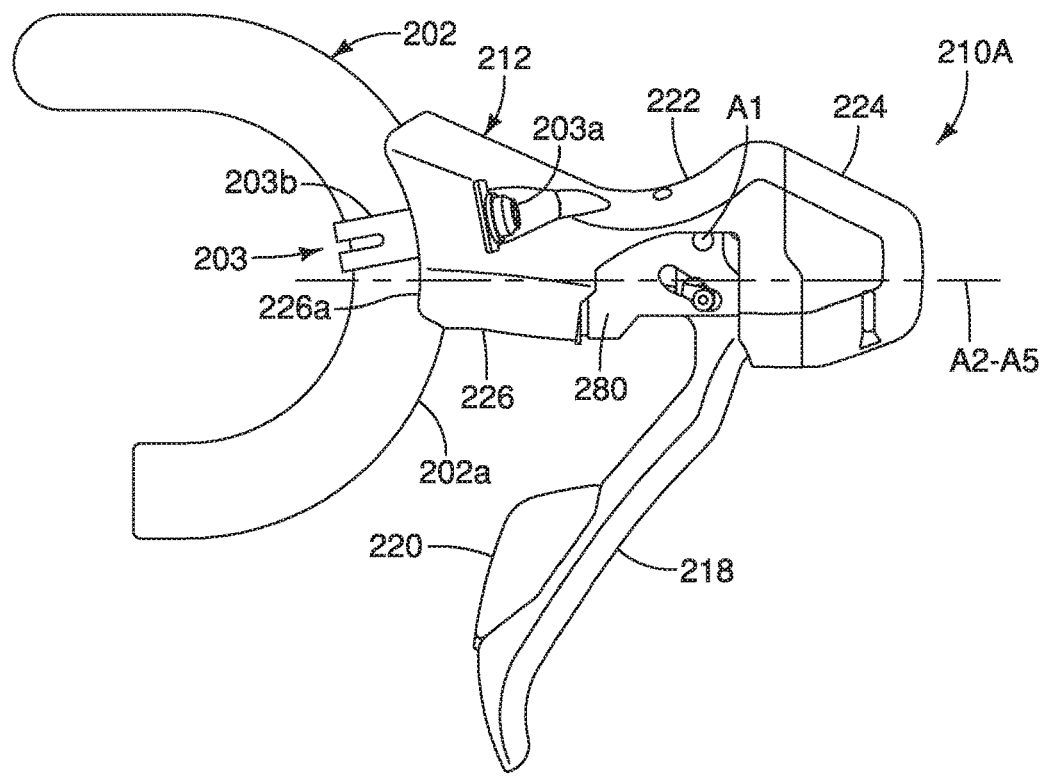
FIG. 22 is an outside elevational view of the right bicycle control device illustrated in FIGS. 21 and 22 with the first and second operating members in their rest (non-operated) positions.
Figure 23:
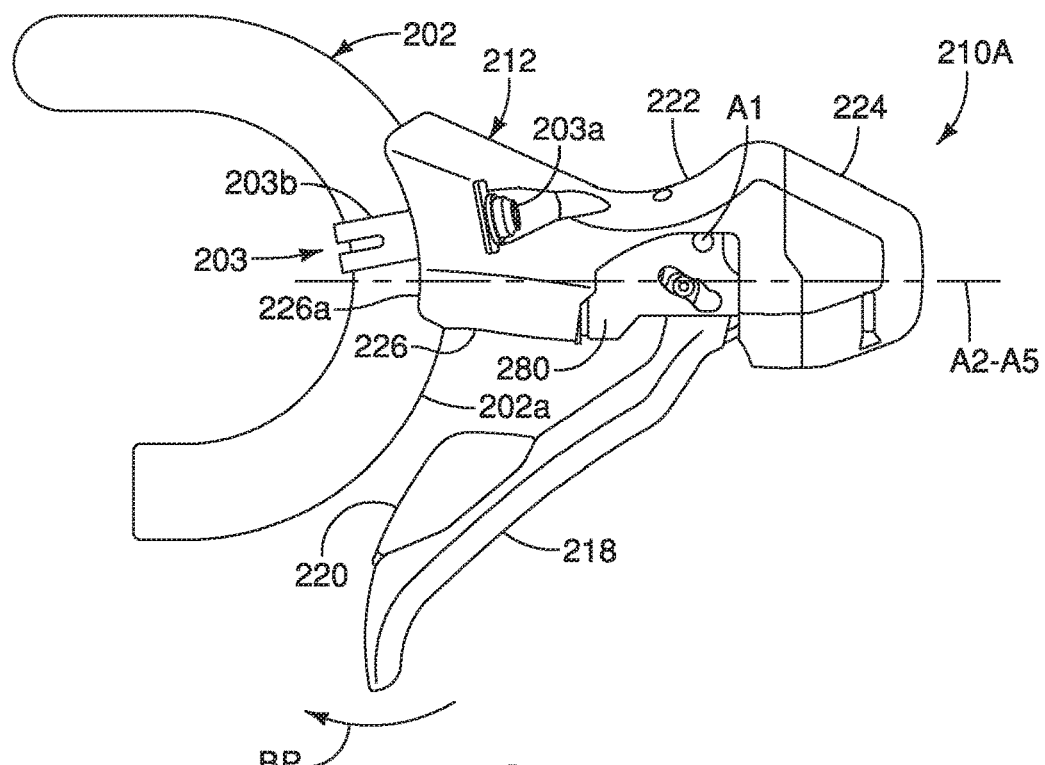
FIG. 23 is an outside elevational view, similar to FIG. 22, of the right bicycle control device, but with the first operating member (i.e., the brake-shift cable pull lever) pivoted about the first pivot axis to the braking position, which causes the second operating member (i.e., the shift cable release lever) to be pivoted together with the first operating member about the first pivot axis with respect to the bracket.
Figure 24:
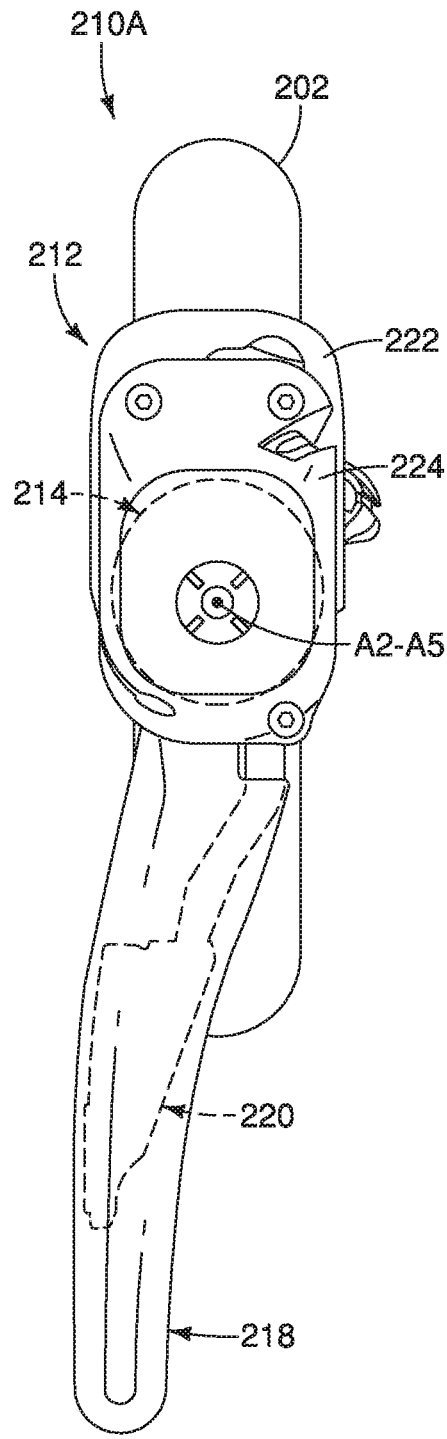
FIG. 24 is a front oblique view of the right bicycle control device illustrated in FIGS. 21 to 23 as viewed parallel to the take-up axis of the shift unit with the first and second operating members in their rest positions.
Figure 25:
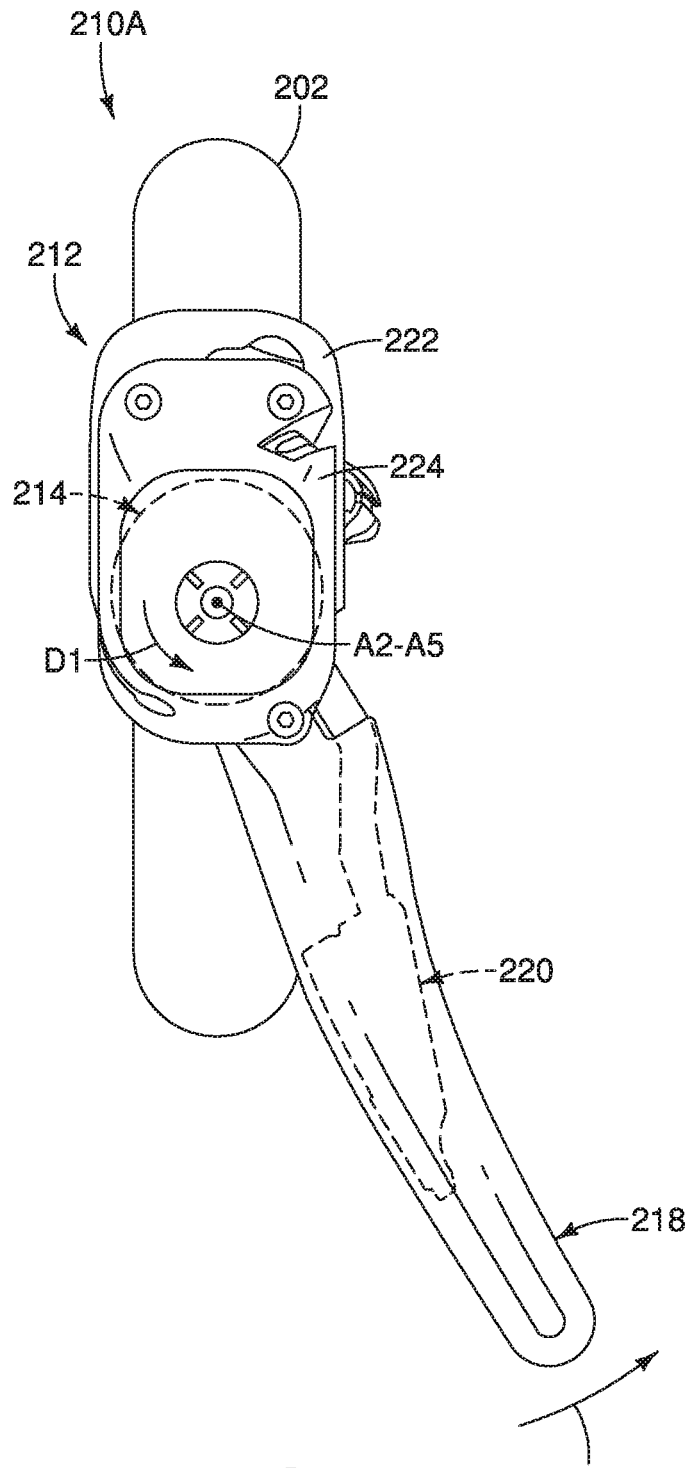
FIG. 25 is a front oblique view of the right bicycle control device illustrated in FIGS. 21 to 24 as viewed parallel to the take-up axis of the shift unit with the first operating member pivoted about the second pivot axis to a cable pulling position, which causes the second operating member to be pivoted together with the first operating member about the second pivot axis with respect to the bracket.
Figure 26:
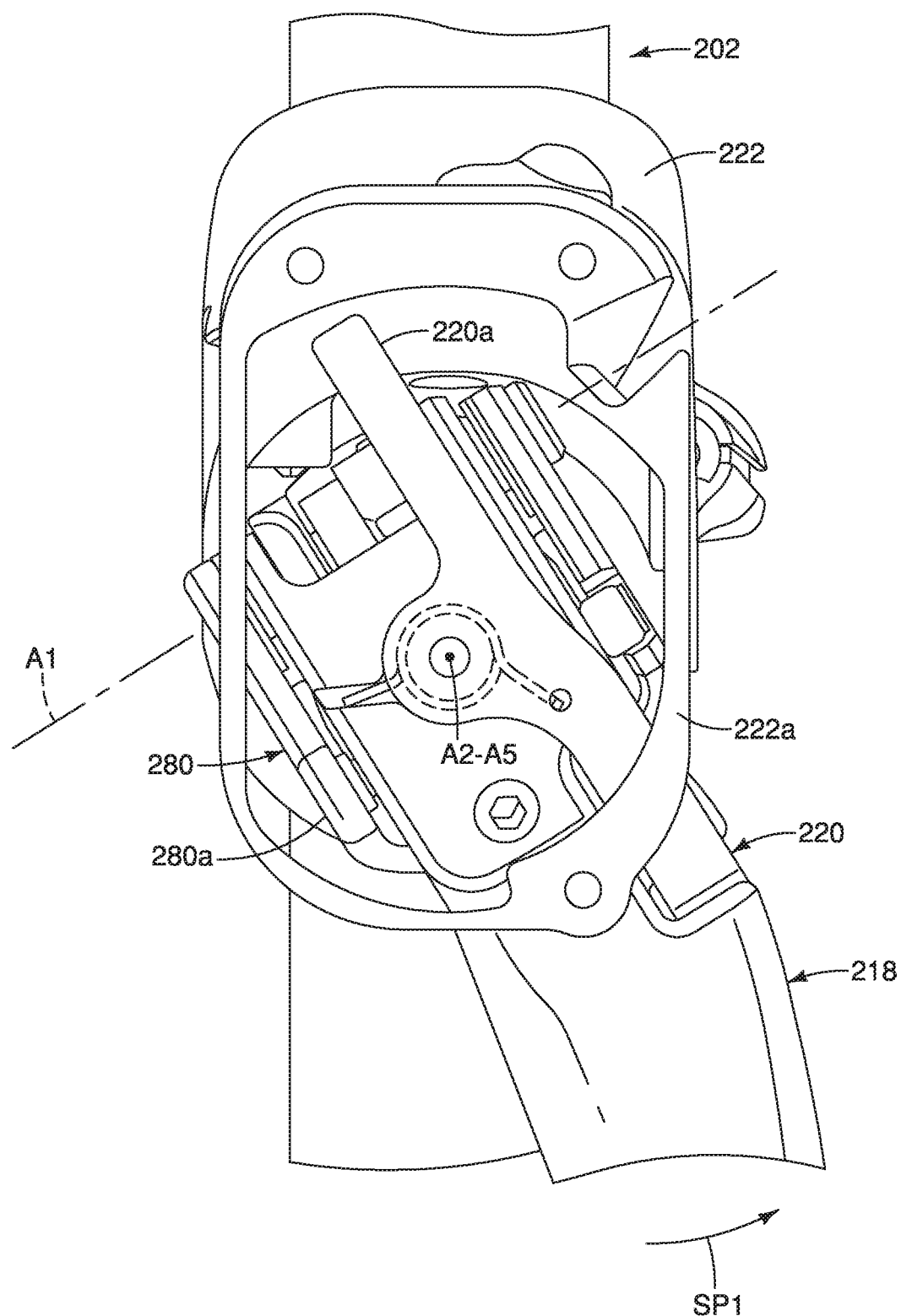
FIG. 26 is an enlarged view of a portion of the right bicycle control device illustrated in FIG. 25, but with the attachment portion and the shift unit removed.
Figure 27:
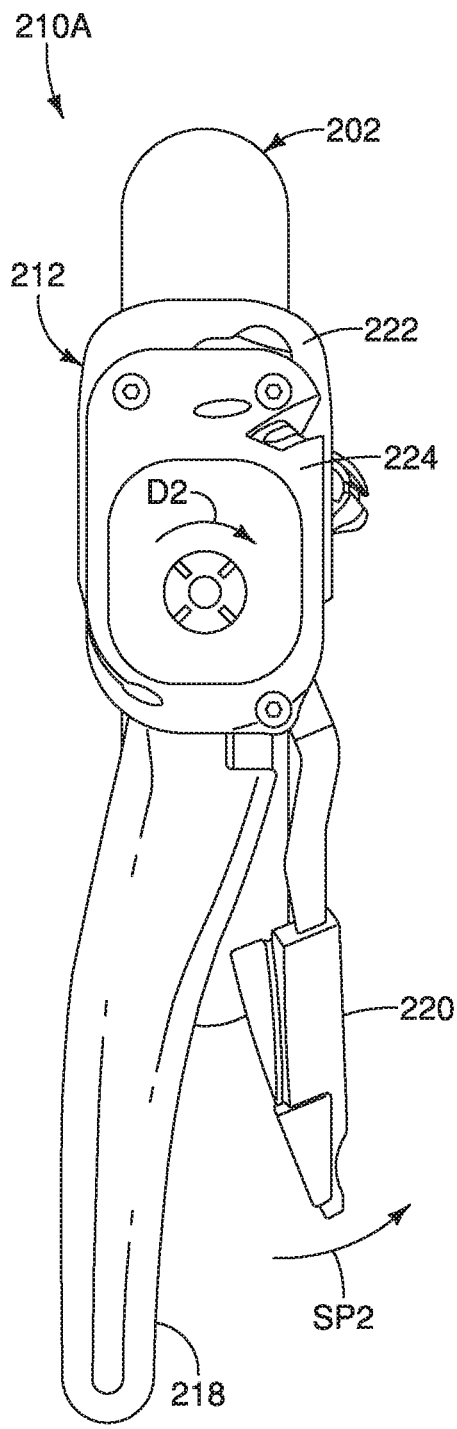
FIG. 27 is a front oblique view of the right bicycle control device illustrated in FIGS. 21 to 25 as viewed parallel to the take-up axis of the shift unit with the second operating member pivoted about the second pivot axis to a cable releasing position, in which the first operating member remains stationary with respect to the bracket.
Figure 28:
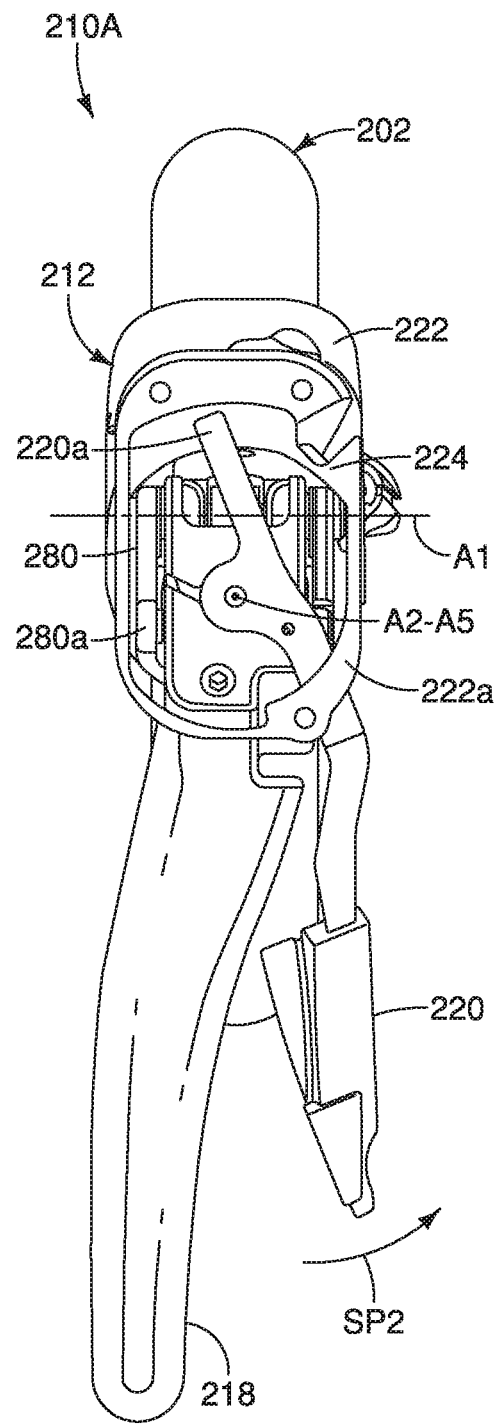
FIG. 28 is a front oblique view, similar to FIG. 27, of the right bicycle control device illustrated in FIGS. 21 to 25, but with the attachment portion and the shift unit removed.

Referring to FIGS. 21 to 23, the bracket 212 basically includes a base portion 222 and a shift unit attachment portion (hereinafter "attachment portion") 224. The base portion 222 of the bracket 12 has a distal end 222*a* and a proximal end or coupling portion 226. The coupling portion 226 includes a mounting surface 226*a* configured to be mounted on an outer peripheral surface of a handlebar 202. The mounting surface 226*a* is a concave surface that is configured to mate with the curved section 202*a* of the handlebar 202. The bracket 212 includes a handlebar fixing structure 203 that is disposed on the mounting surface 226*a*. Thus, the bracket 212 is mounted to the handlebar 202 by the handlebar fixing structure 203. In the third embodiment, the handlebar fixing structure 203 includes a nut member 203*a* and a band 203*b* having bolt member (not shown). The nut member 203*a* cooperates with the bolt member of the band 203*b* that is often used for mounting a bicycle control device to a drop handlebar. The band 203*b* is installed around the curved section 202*a* of the handlebar 202, and the nut member 203*a* attaches the bolt member of the band 203*b* to the base portion 222 of the bracket 212. By tightening the nut member 203*a*, the mounting surface 226*a* of the base portion 222 is pulled into contact with the curved section 202*a* of the handlebar 202.

As seen in FIGS. 22 and 23, the bracket 212 further includes a gripping portion 222*b* that extends from the mounting surface 226*a*. The gripping portion 222*b* is configured to be gripped by a rider. Typically, a grip cover or hood (not shown) is stretched over a gripping portion 222*b* of the bracket 212. The grip cover is made of elastic material such as rubber to provide a comfortable feeling for the rider's hand while the rider is gripping the gripping portion 222*b* of the bracket 212.

The attachment portion 224 is configured to be removably attached to the base portion 222 in the same manner as in the first embodiment as explained above. The shift unit 214 is mounted to the attachment portion 224 of the bracket 212 such that the attachment portion 224 covers the shift unit 214. The hydraulic cylinder unit 216 is mounted to the base portion 222 of the bracket 212. With this configuration, the hydraulic cylinder unit 216 is mounted to the bracket 212 in a location that is closer to the handlebar 202 than the shift unit 214 in a state where the bicycle control device 210A is mounted to the handlebar 202. Thus, the bracket 212 houses both the shift unit 214 and the hydraulic cylinder unit 216.

Referring to FIGS. 23 to 28, the movements of the first and second operating members 218 and 220 will now be discussed. The first operating member 218 is pivotally mounted relative to the bracket 212 to pivot around the first pivot axis A1 to operate the hydraulic cylinder unit 216, similar to the first embodiment as discussed above. The first operating member 218 is further pivotally mounted relative to the bracket 212 to pivot around the second pivot axis A2 to actuate the shift unit 214, similar to the first embodiment as discussed above. The second operating member 220 is pivotally mounted relative to the bracket 212 to pivot around the third pivot axis A3 to operate the shift unit 214, similar to the first embodiment as discussed above. With this configuration, the first operating member 218 is configured to perform a braking operation when moved along the braking path BP (FIG. 23) generally parallel to a center longitudinal plane of the bicycle 201, similar to the first embodiment as discussed above. Also with this configuration, the first operating member 218 is configured to perform a cable pulling operation when moved along the first shifting path SP1 (FIG. 25) towards the center longitudinal plane of the bicycle 201, similar to the first embodiment as discussed above. On the other hand, the second operating member 220 is configured to perform a cable releasing operation when moved along the second shifting path SP2 (FIG. 27) towards the center longitudinal plane of the bicycle 201, similar to the first embodiment as discussed above. The shift unit 214 remains stationary as the first operating member 218 pivots with respect to the bracket 212 around the first pivot axis A1 to perform the braking operation, similar to the first embodiment as discussed above.

Figure 30:
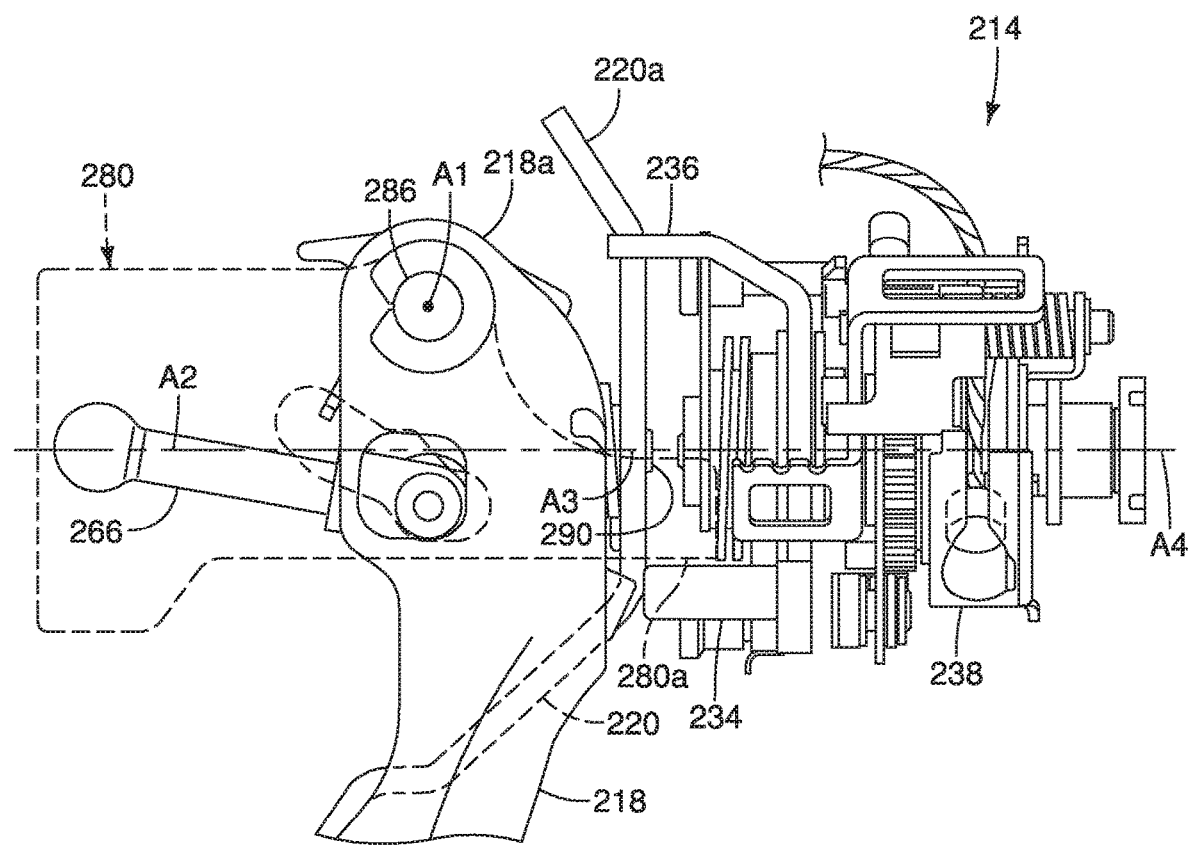
FIG. 30 is an enlarged view of a portion of the right bicycle control device illustrated in FIG. 29.

Referring to FIG. 30, the shift unit 214 basically includes a first input member 234, a second input member 236 and a cable take-up member or spool 238. The shift unit 214 is identical to the shift unit 14, discussed above, and the basic construction and operation of the shift unit 214 is described in U.S. Patent Application Publication No. 2012/0297919.

Figure 29:
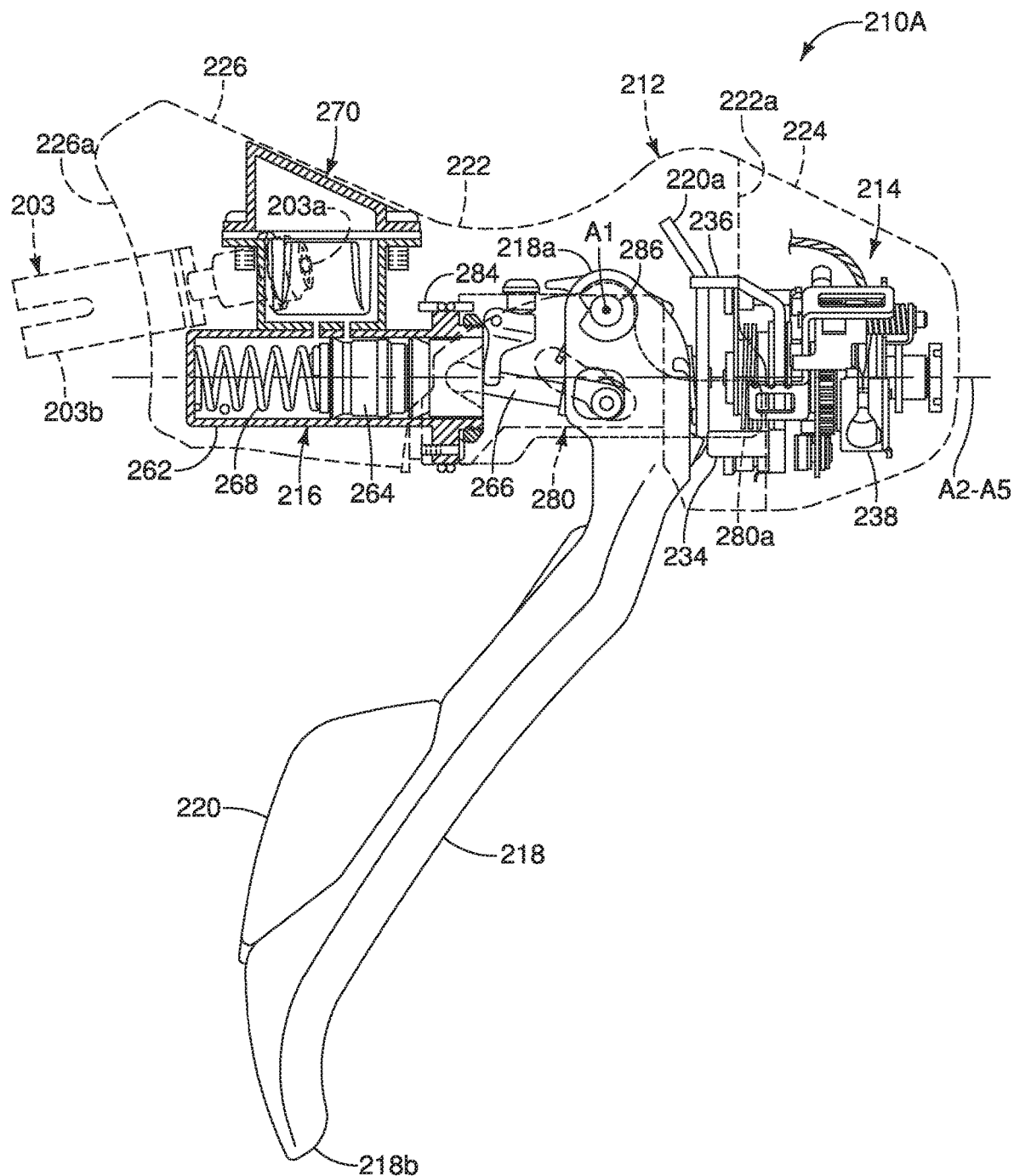
FIG. 29 is an outside elevational view of the right bicycle control device illustrated in FIGS. 21 to 25 with the bracket and the attachment member shown in dashed lines.

As seen in FIG. 29, basically, the hydraulic cylinder unit 216 includes a hydraulic cylinder 262 and a piston 264. The hydraulic cylinder 262 defines a longitudinal center axis A5. The hydraulic cylinder 262 is arranged on the bracket 212 such that the longitudinal center axis A5 is disposed under the handlebar fixing structure 203 in a state where the bracket 212 is attached to the handlebar 202 by the handlebar fixing structure 203. In the third embodiment, the hydraulic cylinder 262 is disposed under the nut member 203a in a state where the bracket 212 is attached to the handlebar 202 by the handlebar fixing structure 203. The piston 264 is movably disposed in the hydraulic cylinder 262 along the longitudinal center axis A5. Preferably, the hydraulic cylinder unit 216 is detachably, mounted to the bracket 212 so as to be detached and reattached to the bracket 212 in the same manner as discussed above with respect to the first embodiment. The longitudinal center axis A5 of the hydraulic unit 216 is coaxial with the second pivot axis A2. Further, the longitudinal center axis A5 of the hydraulic cylinder unit 216 is coaxial with the take-up axis A4 of the cable take-up member 238. Furthermore, the second axis A2, the third axis A3, the take-up axis A4 and the longitudinal center axis A5 are coaxial with each other. The hydraulic cylinder unit 216 is mounted to the bracket 212 at a location that is closer to the handlebar 202 than the shift unit 214 in a state where the bicycle control device 210A is mounted to the handlebar 202. Thus, the hydraulic cylinder unit 216 is mounted to the bracket 212 in a location that is closer to the mounting surface 226a than the shift unit 212. Also with this arrangement, the hydraulic cylinder unit 216 is mounted to the bracket 212 so as to be disposed between the mounting surface 226a and the shift unit 214 without overlapping with die shift unit 214 in any direction perpendicular to the longitudinal center axis A5 of the hydraulic cylinder unit 216.

A piston rod 266 operatively connects the first operating member 218 to the piston 264 such that pivotal movement of the first operating member 218 around the first pivot axis A1 cause the piston 264 to move from a rest position to an actuated position. The first operating member 218 is pivotally connected to a first end of the piston rod 266, and the piston 264 is pivotally connected to a second end of the piston rod 266. In this way, the first operating member 218 is connected to the piston 264 that is disposed in the hydraulic cylinder 262 to move the piston 264 as the first operating member 218 is pivoted around the first pivot axis A1.

The hydraulic cylinder unit 216 further includes a biasing element 268 that is disposed inside the hydraulic cylinder 262 between a closed end wall of the hydraulic cylinder 262 and the piston 264. The biasing element 268 biases the piston 264 to a non-braking position. The biasing element 268 also acts as a return spring for biasing the first operating member 218 to its rest position with respect to first pivot axis A1.

Still referring to FIG. 29, the bicycle control device 210A further comprises a reservoir unit 270 that fluidly communicates with the interior of the hydraulic cylinder 262 of the hydraulic cylinder unit 216. The reservoir unit 270 is detachably mounted to the bracket 212 so as to be detached and reattached to the bracket 212. Essentially, the reservoir unit 270 has the same construction as the reservoir unit 70. Thus, for the sake of brevity, the reservoir unit 270 will not be discussed in further detail.

As seen in FIGS. 29 and 30, the bicycle control device 210A further comprises an attachment member 280. The attachment member 280 supports the first and second operating members 218 and 220 to the bracket 212. Thus, the first and second operating members 218 and 220 and the attachment member 280 form an actuating unit of the bicycle control device 210A. The attachment member 280 is pivotally coupled to the hydraulic cylinder unit 216 around the second pivot axis A2. In particular, the attachment member 280 is pivotally secured to the hydraulic cylinder 262 of the hydraulic cylinder unit 216 in the same manner as in the first embodiment. Thus, the attachment member 280 forms the second pivot axis A2, The second pivot axis A2 is coaxial with the longitudinal center axis A5 of the hydraulic cylinder unit 216 and the take-up axis A4 of the cable take-up member 238. A biasing element 284 is operatively disposed between die attachment member 280 and the bracket 212 to bias the attachment member 280 to its rest position. The attachment member 280 has an actuating part 280a. The actuating part 280a is arranged to contact the first input member 234 of the shift unit 214 as the attachment member 280 pivots from the rest position to the operated position about the second pivot axis A2. Thus, the attachment member 280 causes the cable take-up member 238 to rotate in the first (cable pulling) direction in response to the operation of the first operating member 218.

The first operating member 218 will be discussed in more detail. The first operating member 218 is a trigger lever that is held in the rest position by the biasing elements 268 and 284. As mentioned above, the first operating member 218 pivots around the first pivot axis A1 to operate the hydraulic cylinder unit 216 and around the second pivot axis A2 to operate the shift unit 214. The first operating member 218 has a mounting portion 218a and a distal free end portion 218b. The mounting portion 218a has the first pivot axis A1. The distal free end portion 218b is spaced apart from the bracket 212. The first pivot axis A1 is located on a first side of the center longitudinal axis A5 of the hydraulic cylinder unit 216. The distal free end portion 218b is located on a second side of the center longitudinal axis A5 of the hydraulic cylinder unit 216 as viewed in a direction parallel to the first pivot axis A1. The first pivot axis A1 is also arranged such that, the longitudinal center axis A5 of the hydraulic cylinder unit 216 extends between the first pivot axis A1 and the distal end portion 218b. The first pivot axis A1 is disposed between the shift unit 214 and the coupling portion 226. The first pivot axis A1 is located above the center longitudinal axis A5 of the hydraulic cylinder unit 216 in a state where the bicycle control device 210A is mounted to the handlebar 202.

The first operating member 218 is pivotally mounted to the attachment member 280 around the first pivot axis A1 via a pivot axle 286. Specifically, the first operating member 218 is mounted on a pivot axle 286 that is attached to the attachment member 280. The pivot axle 286 defines the first pivot axis A1. The first pivot axis A1 is disposed between the shift unit 214 and the coupling portion 226 of the bracket 212 along the longitudinal center axis A5. Thus, the first operating member 218 is arranged between the hydraulic cylinder unit 216 and the shift unit 214. The first operating member 218 is connected to the piston 264 that is disposed in the hydraulic cylinder unit 216 to move the piston 264 as the first operating member 218 is pivoted around the first pivot axis A1

As seen in FIGS. 29 and 30, the second operating member 220 is pivotally mounted on the first operating member 218 around the third pivot axis A3. In particular, the second operating member 220 mounted to the first operating member 218 by a pivot axle 290. The pivot axle 290 defines the third pivot axis A3. The second operating member 220 has an actuating part 220a. The actuating part 220a is arranged to contact the second input member 236 of the shift unit 214 as the second operating member 220 pivots from the rest position to the operated position about the third pivot axis A3. Thus, the second operating member 220 causes the cable take-up member 238 to rotate in the second (cable releasing) direction in response to the operation of the second operating member 220. The second operating member 220 is a trigger lever that is biased to the rest position in the same manner as the second operating member 20 as discussed above.

Figure 31:
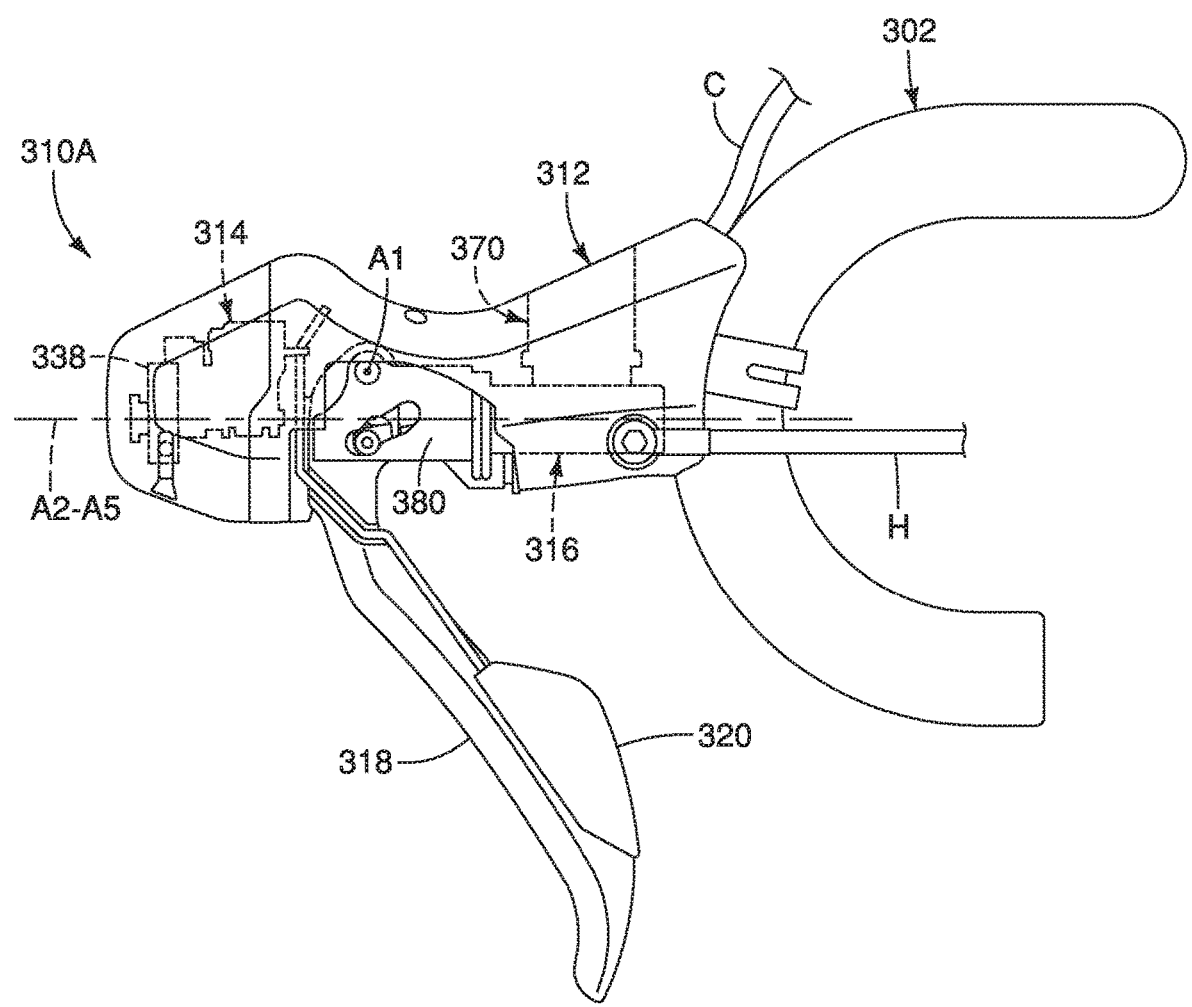
FIG. 31 is an inside perspective view of a right bicycle control device having a first operating member that performs a braking operation and a second operating member that performs shifting operations (i.e., a cable pulling operation and a cable releasing operation) in accordance with a fourth embodiment with the bicycle control device attached to the curved section of a drop handlebar.
Figure 32:
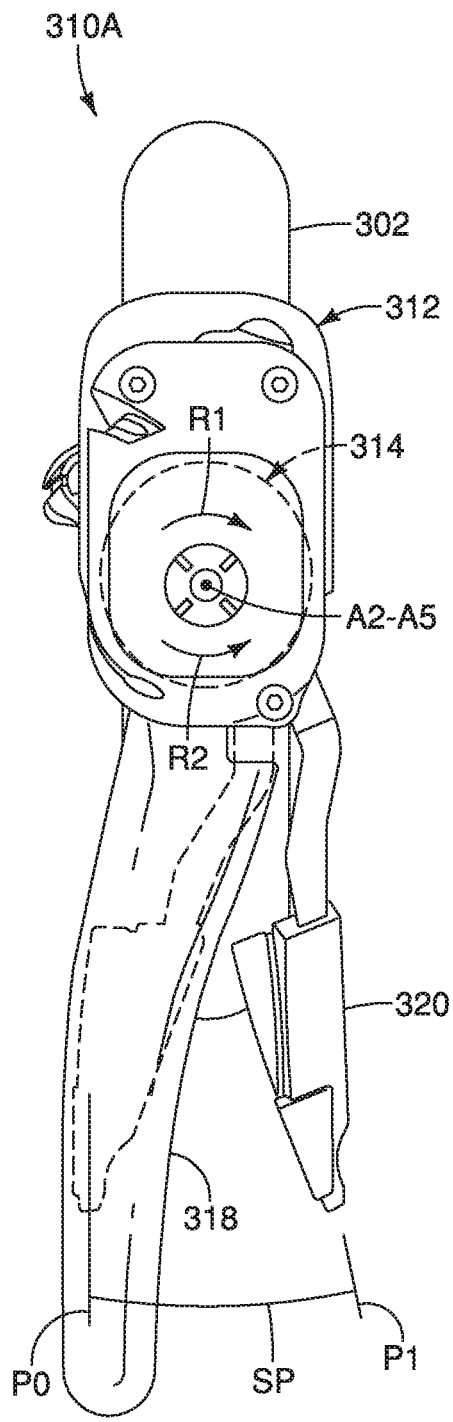
FIG. 32 is a front oblique view of the right bicycle control device illustrated in FIG. 31 as viewed parallel to the take-up axis of the shift unit with the first operating member in its rest position and the second operating member moved from the rest position shown in dashed lines to a first operated position that performs a shifting operation (i.e., a cable releasing operation)
Figure 33:
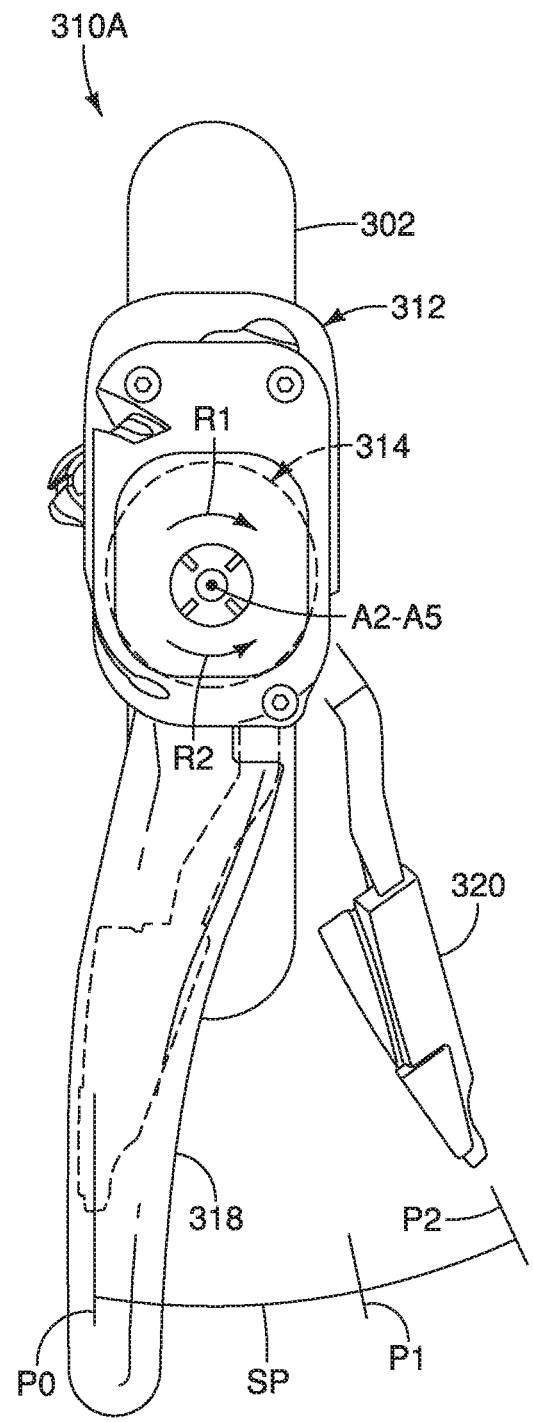
FIG. 33 is a front oblique view of the right bicycle control device illustrated in FIGS. 31 and 32 as viewed parallel to the take-up axis of the shift unit with the first operating member in its rest position and the second operating member moved from the rest position shown in dashed lines to a second operated position that performs a shifting operation (i.e., a cable pulling operation).

Referring now to FIGS. 31 to 33, a handlebar 302 is illustrated having a bicycle control device 310A mounted thereon in accordance with a fourth embodiment. Here in the fourth embodiment, the handlebar 302 is a drop handlebar in which the bicycle control device 310A is attached to the right curved section. Thus, the bicycle control device 310A is a drop handlebar control device, which means that they are configured to be mounted to a curved section of a drop handlebar.

Basically, as seen in FIG. 20, the bicycle control device 310A is a right hand side control device that is operated by the rider's right hand to actuate a first hydraulic brake device (not shown) and a first gear shifting device (not shown). Similar to the prior embodiments, the bicycle control device 310A is operatively coupled to a hydraulic brake device (not shown) via a hydraulic brake hose H, and to a gear shifting device (not shown) via a control cable C.

The bicycle control device 310A preferably includes a bracket 312, a shift unit 314, a hydraulic cylinder unit 316 and a first operating member 318. Preferably, in the fourth embodiment, the bicycle control device 310A further includes a second operating member 320. The bracket 312 is identical to the bracket 212 of the third embodiment, except for the channel that guides the cable C is provided on the outside surface of the bracket 312 instead of the inside surface as in the third embodiment. The bracket 312 is mounted to handlebar 302 in the same manner as the third embodiment. The shift unit 314 is identical to the shift unit 114 of the second embodiment. The hydraulic cylinder unit 316 is identical to the hydraulic cylinder units 16, 116 and 216 of the prior embodiments. The first operating member 318 operates the hydraulic cylinder unit 316 in the same manner as the first embodiment, but does not operate the shift unit 314. The second operating member 320 operates the shift unit 314 in the same manner as the first operating member 118 of the second embodiment operates the shift unit 114. The bracket 312, the shift unit 314, the hydraulic cylinder unit 316, the first operating member 318 and the second operating member 320 are configured and arranged to form pivot axes A1 and A3 to A5 of the same arrangement as in the bicycle control device 10A of the first embodiment. Since the first operating member 318 only operates the hydraulic cylinder unit 316, the first operating member 318 does not pivot about the second pivot axis A2.

Here, as seen in FIGS. 32 and 33, the second operating member 320 is configured to pivot along a shifting path SP from a rest position P0 to a first shift position P1 to actuate the shift unit 314. The second operating member 320 is further configured to be moved further along the shifting path SP from the rest position P0 past the first shift position P1 to a second shift position P2 to actuate the shift unit 314. The shift unit 314 is configured to rotate a cable take-up member 338 in a first direction R1 about a rotational axis (i.e., the take-up axis A4) as the second operating member 320 is moved from the rest position P0 to the first shift position P1. The shift unit 314 is configured to rotate the cable take-up member 338 in a second direction R2 about the rotational axis (i.e., the take-up axis A4) as the second operating member 320 is moved from the rest position P0 to the second shift position P2. The second direction R2 is opposite to the first direction R1.

Here, with the shift unit 314, the cable take-up member 338 is rotated in the first direction R1, which corresponds to a cable releasing direction, upon the second operating member 320 reaching the first shift position P1, but not being moved past the first shift position P1 and then subsequently being released in a single stroke of the second operating member 320. However, with the shift unit 314, the cable take-up member 338 is rotated in a second direction R2, which corresponds to a cable pulling direction, upon the second operating member 320 being progressively move towards and reaching the second shift position P2 in a single stroke of the second operating member 320. The second direction R2 is opposite to the first direction R1.

The bicycle control device 310A preferably further comprises a reservoir unit 370 that fluidly communicates with the interior of the hydraulic cylinder of the hydraulic cylinder unit 316. The reservoir unit 370 is detachably mounted to the bracket 312 so as to be detached and reattached to the bracket 312. Essentially, the reservoir unit 370 has the same construction as the reservoir unit 70. Thus, for the sake of brevity, the reservoir unit 370 will not be discussed in further detail.

As seen in FIG. 31, the bicycle control device 310A further comprises an attachment member 380. The attachment member 380 supports the first and second operating members 318 and 320 to the bracket 312. However, in this fourth embodiment, the attachment member 380 is fixed to the bracket 312.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle control device. Accordingly, these directional terms, as utilized to describe the bicycle control device should be interpreted relative to a bicycle in an upright riding position on a horizontal surface and that is equipped with the bicycle control device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control device comprising:
   a bracket having a first end and a second end, the bracket including a coupling portion disposed at the first end, the coupling portion being configured to be coupled to a handlebar;
   a shift unit mounted to the second end of the bracket;
   a hydraulic cylinder unit mounted to the bracket in a location that is closer to the coupling portion than the shift unit; and
   a first operating member pivotally mounted relative to the bracket around a first pivot axis to operate the hydraulic cylinder unit, the first operating member and the first pivot axis being disposed between the shift unit and the hydraulic cylinder unit, the first operating member being configured to be pivoted around a second pivot axis that is different from the first pivot axis to actuate the shift unit,
   the shift unit being mounted to the bracket such that the shift unit remains stationary with respect to the bracket and does not pivot around the first pivot axis when the first operating member pivots with respect to the bracket around the first pivot axis to perform a braking operation.

2. The bicycle control device according to claim 1, wherein
   the hydraulic cylinder unit is disposed between the shift unit and the coupling portion.

3. The bicycle control device according to claim 1, wherein
   the second end is a distal end of the bracket which is opposite the coupling portion.

4. The bicycle control device according to claim 1, wherein
   the hydraulic cylinder unit includes a hydraulic cylinder defining a longitudinal center axis and a piston movably disposed in the hydraulic cylinder along the longitudinal center axis,
   the first operating member being connected to the piston to move the piston as the first operating member is pivoted around the first pivot axis, and
   the longitudinal center axis being coaxial with the second pivot axis.

5. The bicycle control device according to claim 4, further comprising
   a second operating member pivotally mounted relative to the bracket around a third pivot axis to operate the shift unit.

6. The bicycle control device according to claim 5, wherein
   the third pivot axis is coaxial with the second pivot axis.

7. The bicycle control device according to claim 4, wherein
   the shift unit includes a cable take-up member configured to be rotatable around a take-up axis.

8. The bicycle control device according to claim 7, wherein
   the take-up axis is coaxial with the second pivot axis.

9. The bicycle control device according to claim 1, wherein
   the hydraulic cylinder unit has a fluid outlet that is located adjacent to the coupling portion.

10. The bicycle control device according to claim 1, wherein the hydraulic cylinder unit is configured to be detachably mounted to the bracket.

11. The bicycle control device according to claim 1, wherein
the hydraulic cylinder unit includes a hydraulic cylinder defining a longitudinal center axis, and
the first operating member has a mounting portion having the first pivot axis and a distal free end portion which is spaced from the bracket, the first pivot axis being located on a first side of the center longitudinal axis, and the distal free end portion being located on a second side of the center longitudinal axis as viewed in a direction parallel to the first pivot axis.

12. The bicycle control device according to claim 1, further comprising
a second operating member pivotally mounted relative to the bracket around a third pivot axis to operate the shift unit.

13. The bicycle control device according to claim 12, wherein
the second operating member is configured to pivot along a shifting path from a rest position to a first shift position to actuate the shift unit, and is configured to be moved further along the shifting path from the rest position past the first shift position to a second shift position to actuate the shift unit, and
the shift unit includes a cable take-up member configured to be rotatable around a take-up axis, the shift unit is configured to rotate the cable take-up member in a first direction about the take-up axis as the second operating member is moved from the rest position to the first shift position, and the shift unit is configured to rotate the cable take-up member in a second direction about the take-up axis as the second operating member is moved from the rest position to the second shift position, the second direction is opposite to the first direction.

14. The bicycle control device according to claim 1, further comprising
a reservoir unit fluidly communicating with the hydraulic cylinder unit.

15. The bicycle control device according to claim 14, wherein
the reservoir unit is configured to be detachably mounted to the bracket.

16. The bicycle control device according to claim 1, wherein
the hydraulic cylinder unit is mounted to the bracket at a location that is closer to the handlebar than the shift unit in a state where the bicycle control device is mounted to the handlebar.

17. The bicycle control device according to claim 1, wherein
the bracket includes a base portion and an attachment portion, the base portion having the coupling portion, and the attachment portion being configured to be removably attached to the base portion at the second end of the bracket, and to cover the shift unit.

18. The bicycle control device according to claim 17, wherein
the shift unit is mounted to the attachment portion, and the attachment portion is removably mounted to the base portion with the shift unit being mounted to the attachment portion as unit.

19. The bicycle control device according to claim 17, wherein the second end is a distal end of the bracket with respect to the handlebar in the state where the base portion is mounted to the handlebar.

20. The bicycle control device according to claim 1, wherein
the coupling portion is configured to be coupled to an end portion of the handlebar.

21. The bicycle control device according to claim 1, wherein
the coupling portion includes a mounting surface configured to be mounted on an outer peripheral surface of the handlebar.

22. The bicycle control device according to claim 21, wherein
the bracket includes a handlebar fixing structure disposed on the mounting surface, and
the hydraulic cylinder unit includes a hydraulic cylinder defining a longitudinal center axis that is disposed under the handlebar fixing structure in a state where the bracket is attached to the handlebar by the handlebar fixing structure.

23. The bicycle control device according to claim 1, wherein
the bracket includes a gripping portion extending from the mounting surface and configured to be gripped by a rider.

24. The bicycle control device according to claim 1, wherein the first pivot axis of the first operating member is disposed above a center longitudinal axis of the hydraulic cylinder unit in a state where the bracket is attached to the handlebar.

25. A bicycle control device comprising:
a bracket having a first end and a second end, the bracket including a coupling portion disposed at the first end, the coupling portion being configured to be coupled to a handlebar;
a shift unit mounted to the second end of the bracket;
a hydraulic cylinder unit mounted to the bracket in a location that is closer to the coupling portion than the shift unit;
a first operating member pivotally mounted relative to the bracket around a first pivot axis to operate the hydraulic cylinder unit, the first pivot axis being disposed between the shift unit and the coupling portion, the first operating member being arranged between the hydraulic cylinder unit and the shift unit, the first operating member being configured to be pivoted around a second pivot axis that is different from the first pivot axis to actuate the shift unit; and
an attachment member pivotally coupled to the hydraulic cylinder unit around the second pivot axis,
the hydraulic cylinder unit including a hydraulic cylinder defining a longitudinal center axis and a piston movably disposed in the hydraulic cylinder along the longitudinal center axis,
the first operating member being connected to the piston to move the piston as the first operating member is pivoted around the first pivot axis,
the longitudinal center axis being coaxial with the second pivot axis, and
the first operating member being pivotally mounted to the attachment member around the first pivot axis.

26. A bicycle control device comprising:
a bracket having a first end and a second end, the first end of the bracket being configured to be coupled to a handlebar;
a shift unit mounted to the second end of the bracket;

a hydraulic cylinder unit mounted to the bracket in a location that is closer to the handlebar than the shift unit in a state where the bicycle control device is mounted to the handlebar; and a first operating member pivotally mounted relative to the bracket around a first pivot axis to operate the hydraulic cylinder unit, the first operating member and the first pivot axis being disposed between the shift unit and the hydraulic cylinder unit, the first operating member being configured to be pivoted around a second pivot axis that is different from the first pivot axis to actuate the shift unit, the shift unit being mounted to the bracket such that the shift unit remains stationary with respect to the bracket and does not pivot around the first pivot axis when the first operating member pivots with respect to the bracket around the first pivot axis to perform a braking operation.

27. The bicycle control device according to claim 26, wherein
the hydraulic cylinder unit is configured to be detachably mounted to the bracket.

28. The bicycle control device according to claim 26, further comprising
a reservoir unit fluidly communicating with the hydraulic cylinder unit.

29. The bicycle control device according to claim 28, wherein
the reservoir unit is configured to be detachably mounted to the bracket.

30. The bicycle control device according to claim 26, wherein
the bracket includes a base portion and an attachment portion, the base portion having the coupling portion, and the attachment portion being configured to be removably attached to the base portion at the second end of the bracket and to cover the shift unit.

31. The bicycle control device according to claim 30, wherein
the shift unit is mounted to the attachment portion, and the attachment portion is removably mounted to the base portion with the shift unit being mounted to the attachment portion as unit.

32. The bicycle control device according to claim 30, wherein
the second end is a distal end of the bracket with respect to the handlebar in the state where the base portion is mounted to the handlebar.

33. The bicycle control device according to claim 26, wherein
the hydraulic cylinder unit includes a hydraulic cylinder defining a longitudinal center axis, and
the first operating member has a mounting portion having the first pivot axis and a distal free end portion which is spaced from the bracket, the first pivot axis being located on a first side of the center longitudinal axis, and the distal free end portion being located on a second side of the center longitudinal axis as viewed in a direction parallel to the first pivot axis.

34. A bicycle control device comprising:
a bracket;
a shift unit mounted to the bracket, the shift unit including a cable take-up member;
an operating member that is separate from the cable take-up member and pivotally mounted relative to the bracket around a first pivot axis, the operating member being arranged and configured to be pivoted around a second pivot axis different from the first pivot axis to operate the shift unit, the shift unit remaining stationary with respect to the bracket and not pivoting around the first pivot axis when the operating member pivots with respect to the bracket around the first pivot axis to perform a braking operation; and
a hydraulic cylinder unit mounted to the bracket in a location that is closer to the handlebar than the shift unit in a state where the bicycle control device is mounted to the handlebar,
the bracket including a base portion configured to be coupled to a handlebar, and an attachment portion configured to be removably attached to the base portion, the attachment portion including a cavity in which the shift unit is housed, the attachment portion covering the cable take-up member of the shift unit and the cavity facing the base portion when the attachment portion is attached to the base portion.

35. The bicycle control device according to claim 34, wherein the shift unit is mounted to the attachment portion, and the attachment portion is removably mounted to the base portion with the shift unit being mounted to the attachment portion as unit.

36. The bicycle control device according to claim 34, wherein the attachment portion is located at a distal end of the bracket with respect to the handlebar in the state where the base portion is mounted to the handlebar.

37. A bicycle control device comprising:
a bracket having a first end and a second end, the bracket including a coupling portion disposed at the first end, the coupling portion configured to be coupled to a handlebar;
a shift unit mounted to the second end of the bracket, the shift unit including a cable take-up member configured to be rotatable around a take-up axis;
a hydraulic cylinder unit mounted to the bracket in a location that is closer to the coupling portion than the shift unit; and
an operating member pivotally mounted relative to the bracket around a first pivot axis that is different from the take-up axis, the operating member being configured to be pivoted around the take-up axis to actuate the shift unit, the operating member being mounted to the bracket separately from the cable take-up member, the operating member and the first pivot axis being disposed between the cable take-up member and the coupling portion,
the shift unit being mounted to the bracket such that the shift unit remains stationary with respect to the bracket and does not pivot around the first pivot axis when the operating member pivots with respect to the bracket around the first pivot axis to perform a braking operation.

* * * * *